US012745049B2

(12) United States Patent
Hofbauer et al.

(10) Patent No.: US 12,745,049 B2
(45) Date of Patent: Sep. 22, 2026

(54) METHOD OF PROCESSING AN AUDIO SIGNAL IN A HEARING DEVICE

(71) Applicant: SONOVA AG, Staefa (CH)

(72) Inventors: Markus Hofbauer, Hombrechtikon (CH); Sebastian Stenzel, Stäfa (CH); Raoul Glatt, Zürich (CH); Leonard Cornelisse, Waterloo (CA)

(73) Assignee: Sonova AG, Staefa (CH)

(*) Notice: Subject to any disclaimer, the term of this patent is extended or adjusted under 35 U.S.C. 154(b) by 129 days.

(21) Appl. No.: 18/765,908

(22) Filed: Jul. 8, 2024

(65) Prior Publication Data

US 2025/0030993 A1 Jan. 23, 2025

(30) Foreign Application Priority Data

Jul. 18, 2023 (EP) .................................... 23185992

(51) Int. Cl.
*H04R 25/00* (2006.01)

(52) U.S. Cl.
CPC ....... *H04R 25/507* (2013.01); *H04R 2225/43* (2013.01)

(58) Field of Classification Search
CPC .............. H04R 25/507; H04R 2225/43; H04R 2225/41; H04R 25/505
See application file for complete search history.

(56) References Cited

U.S. PATENT DOCUMENTS

2022/0084170 A1* 3/2022 Aydin .................... G06N 3/092

FOREIGN PATENT DOCUMENTS

| | | | | |
|---|---|---|---|---|
| CN | 112565997 A * | 3/2021 | .......... | H04R 25/453 |
| DE | 102019206743 A1 | 11/2020 | | |
| WO | 2009153718 A1 | 12/2009 | | |
| WO | 2020152323 A1 | 7/2020 | | |
| WO | 2020152324 A1 | 7/2020 | | |
| WO | WO-2022081260 A1 * | 4/2022 | .......... | H04R 25/507 |

OTHER PUBLICATIONS

English machine translation of CN-112565997-A (Li et al.; Self-adaptive noise reduction method and device of hearing aid, hearing aid and storage medium; published Mar. 2021) (Year: 2021).*
European Search Report and Written Opinion received Dec. 21, 2023 in European Application No. EP23185992.7.
Gerlach Lukas et al: "Analyzing the trade-off between power consumption and beamforming algorithm performance using a hearing aid ASIP", 2017 International Conference on Embedded Computer Systems: Architectures, Modeling, and Simulation (SAMOS), IEEE, Jul. 17, 2017 (Jul. 17, 2017), pp. 88-96, XP033334805, DOI: 10.1109/SAMOS.2017.8344615 [retrieved on Apr. 20, 2018].

* cited by examiner

*Primary Examiner* — Mark Fischer
(74) *Attorney, Agent, or Firm* — ALG Intellectual Property, LLC

(57) ABSTRACT

The disclosure relates to a method of operating a hearing device configured be worn at an ear of a user, the method comprising receiving an audio signal; processing the audio signal by at least one audio processing algorithm to generate a processed audio signal; and outputting, by an output transducer included in the hearing device, an output audio signal based on the processed audio signal so as to stimulate the user's hearing. The disclosure further relates to a hearing device configured to perform the method.

15 Claims, 4 Drawing Sheets

METHOD OF PROCESSING AN AUDIO SIGNAL IN A HEARING DEVICE

RELATED APPLICATIONS

The present application claims priority to EP patent application Ser. No. 23/185,992.7, filed Jul. 18, 2023, which is hereby incorporated by reference in its entirety.

BACKGROUND

Hearing devices may be used to improve the hearing capability or communication capability of a user, for instance by compensating a hearing loss of a hearing-impaired user, in which case the hearing device is commonly referred to as a hearing instrument such as a hearing aid, or hearing prosthesis. A hearing device may also be used to output sound based on an audio signal which may be communicated by a wire or wirelessly to the hearing device. A hearing device may also be used to reproduce a sound in a user's ear canal detected by an input transducer such as a microphone or a microphone array. The reproduced sound may be amplified to account for a hearing loss, such as in a hearing instrument, or may be output without accounting for a hearing loss, for instance to provide for a faithful reproduction of detected ambient sound and/or to add audio features of an augmented reality in the reproduced ambient sound, such as in a hearable. A hearing device may also provide for a situational enhancement of an acoustic scene, e.g. beamforming and/or active noise cancelling (ANC), with or without amplification of the reproduced sound. A hearing device may also be implemented as a hearing protection device, such as an earplug, configured to protect the user's hearing. Different types of hearing devices configured to be be worn at an ear include earbuds, earphones, hearables, and hearing instruments such as receiver-in-the-canal (RIC) hearing aids, behind-the-ear (BTE) hearing aids, in-the-ear (ITE) hearing aids, invisible-in-the-canal (IIC) hearing aids, completely-in-the-canal (CIC) hearing aids, cochlear implant systems configured to provide electrical stimulation representative of audio content to a user, a bimodal hearing system configured to provide both amplification and electrical stimulation representative of audio content to a user, or any other suitable hearing prostheses. A hearing system comprising two hearing devices configured to be worn at different ears of the user is sometimes also referred to as a binaural hearing device. A hearing system may also comprise a hearing device, e.g., a single monaural hearing device or a binaural hearing device, and a user device, e.g., a smartphone and/or a smartwatch, communicatively coupled to the hearing device.

Hearing devices are often employed in conjunction with communication devices, such as smartphones or tablets, for instance when listening to sound data processed by the communication device and/or during a phone conversation operated by the communication device. More recently, communication devices have been integrated with hearing devices such that the hearing devices at least partially comprise the functionality of those communication devices. A hearing system may comprise, for instance, a hearing device and a communication device.

In recent times, some hearing devices are also increasingly equipped with different sensor types. Traditionally, those sensors often include an input transducer to detect a sound, e.g., a sound detector such as a microphone or a microphone array. An amplified and/or signal processed version of the detected sound may then be outputted to the user by an output transducer, e.g., a receiver, loudspeaker, or electrodes to provide electrical stimulation representative of the outputted signal. In an effort to provide the user with even more information about himself and/or the ambient environment, various other sensor types are progressively implemented, in particular sensors which are not directly related to the sound reproduction and/or amplification function of the hearing device. Those sensors include inertial sensors, such as accelerometers, allowing to monitor the user's movements. Physiological sensors, such as optical sensors and bioelectric sensors, are mostly employed for monitoring the user's health.

Since the first digital hearing aid was created in the 1980s, hearing aids have been increasingly equipped with the capability to execute a wide variety of increasingly sophisticated audio processing algorithms intended not only to account for an individual hearing loss of a hearing impaired user but also to provide for a hearing enhancement in rather challenging environmental conditions and according to individual user preferences. Those increased signal processing capabilities, however, also come at a cost of increasingly demanding resources available in the hearing aid such as, e.g., processing power, memory availability and battery life. In this regard, hearing devices are more challenging than other devices due to a restricted amount of space available inside the car canal to accommodate increasingly sophisticated components.

In some cases or situations during usage of a hearing device, however, those sophisticated audio processing algorithms are not necessary or not even desirable to be applied. In particular, signal processing, e.g. deep neural network (DNN) based signal processing, for the purpose of generating audiological user benefit such as, e.g., improved clarity of speech can come with side effects and/or downsides such as an increased power consumption, thus reduced battery life-time, and/or signal processing artefacts and/or unnatural sound perception which are limiting the acceptance of the signal processing by the user and thus limiting its benefit. E.g., in some situations, the user may prefer a longer battery life of the hearing device as compared to an elaborate but also increasingly complex signal processing technique. Further, at least in some situations, the user may also dislike negative side effects caused by the more complex signal processing which may include, e.g., an increased latency and or more pronounced artefacts in the sound reproduced by the hearing device.

Achieving the best overall balance involves making a trade-off between the benefits and the downsides. The trade-off cannot be fully determined by a priori factors such as hearing loss, but varies, e.g., with a user preference, listening intention, life-style/habits and a current situation the user is in. Accordingly, the balance should be variable and under control of the user and/or health care professional (HCP), allowing for a best trade-off and optimally also meeting the user's needs. Typically, the trade-off is experienced/perceived by the user in a real-life situation and/or in a particular use-case and adjusted through a proper interface such as, e.g., an app or through gestures which may also be performed directly on the hearing device. Therefore, an adaptability and/or selection of a momentarily performed audio processing, which may depend on a current situation and/or user preference, would be highly desirable. In particular, an intelligent system may learn and/or estimate the end-user preferred or intended balance and gradually relax the user from taking corrective action while still providing best results.

BRIEF DESCRIPTION OF THE DRAWINGS

Reference will now be made in detail to embodiments, examples of which are illustrated in the accompanying drawings. The drawings illustrate various embodiments and are a part of the specification. The illustrated embodiments are merely examples and do not limit the scope of the disclosure. Throughout the drawings, identical or similar reference numbers designate identical or similar elements. In the drawings.

DETAILED DESCRIPTION OF THE DRAWINGS

Figure 1:
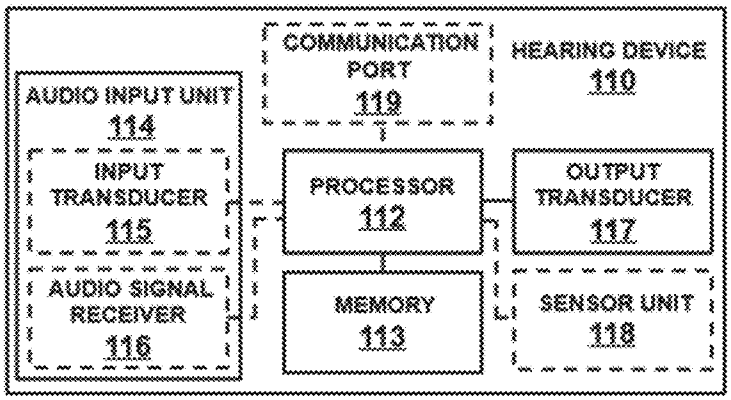
FIG. 1 schematically illustrates an exemplary hearing device.

The disclosure relates to method of operating a hearing device configured to be worn at an ear of a user.

It is a feature of the present disclosure to avoid at least one of the above mentioned disadvantages and to apply an audio processing algorithm which has been selected from a plurality of available algorithms in an optimized way, e.g., on demand of the user and/or commensurate with a current hearing situation. It is another feature to provide for an audio processing in different situations which takes into account the positive and negative side effects of different audio processing algorithms available in the hearing device. It is yet another feature to equip a hearing device with a capability to apply such an optimally selected audio processing algorithm on an input audio signal, in particular in an automated and/or user-selected way. It is a further feature to allow the hearing device to better manage its available resources when it comes to performing a suitable audio processing.

Accordingly, the present disclosure proposes a method of operating a hearing device configured be worn at an ear of a user, the method comprising

- receiving an audio signal;
- processing the audio signal by at least one audio processing algorithm to generate a processed audio signal; and
- outputting, by an output transducer included in the hearing device, an output audio signal based on the processed audio signal so as to stimulate the user's hearing, wherein the method further comprises
- providing different audio processing algorithms each configured to be applied on the audio signal and associated with a performance index indicative of a performance of the audio processing algorithm when applied on the audio signal;
- determining a target index relative to the performance index, the target index indicative of a target performance of said processing of the audio signal;
- selecting, depending on the target index, at least one of the processing algorithms; and
- applying the selected processing algorithm on the audio signal.

In this way, by selecting an audio processing algorithm with a suitable performance index based on the target index, the audio processing can be advantageously adapted to a current hearing situation and/or user requirement. In particular, when applying the audio processing algorithm with the suitable performance index, available resources can be used sparingly and/or negative side effects of the audio processing can be circumvented by also reaching a desired goal of the audio processing. By associating the different processing algorithms with a corresponding performance index, the algorithms can thus be scaled in accordance with an expected processing performance. For instance, a rather memory intensive, power costly and time consuming operation involving a deep neural network (DNN) may then be replaced in favor of another audio processing algorithm which may be more efficient and still allow to reach the desired signal processing goal or may even be suitable to exceed the DNN in at least some aspects of the signal processing. E.g., the target index may be indicative of a desired performance when one or more of the audio processing algorithms are applied on the audio signal.

Independently, the present disclosure also proposes a non-transitory computer-readable medium storing instructions that, when executed by a processor, cause a hearing device to perform operations of the method.

Independently, the present disclosure also proposes a hearing device configured be worn at an ear of a user, the hearing device comprising an input transducer configured to provide an audio signal indicative of a sound detected in the environment of the user;

- a processor configured to process the audio signal by at least one audio processing algorithm to generate a processed audio signal; and
- an output transducer configured to output an output audio signal based on the processed audio signal so as to stimulate the user's hearing, wherein the processor is further configured to
  - provide different audio processing algorithms each configured to be applied on the audio signal and associated with a performance index indicative of a performance of the audio processing algorithm when applied on the audio signal;
  - determine a target index relative to the performance index, the target index indicative of a target performance of said processing of the audio signal;
  - select, depending on the target index, at least one of the processing algorithms; and
  - apply the selected processing algorithm on the audio signal.

Independently, the present disclosure also proposes a hearing system comprising a first hearing device and a second hearing device each configured be worn at a different ear of a user,

- the first hearing device comprising a first input transducer configured to provide a first audio signal indicative of sound detected in the environment of the user, and the second hearing device comprising a second input transducer configured to provide a second audio signal indicative of sound detected in the environment of the user;

the hearing system further comprising a processor configured to process the first and second audio signal by at least one audio processing algorithm to generate a processed audio signal; and the first hearing device further comprising a first output transducer configured to output a first output audio signal based on the processed audio signal, and the second hearing device further comprising a second output transducer configured to output a second output audio signal based on the processed audio signal so as to stimulate the user's hearing, wherein the processor is further configured to provide different audio processing algorithms each configured to be applied on the first and second audio signal and associated with a performance index indicative of a performance of the audio processing algorithm when applied on the first and second audio signal;

determine a target index relative to the performance index, the target index indicative of a target performance of said processing of the audio signal;

select, depending on the target index, at least one of the processing algorithms; and apply the selected processing algorithm on the first and second audio signal.

Subsequently, additional features of some implementations of the method of operating a hearing device and/or the computer-readable medium and/or the hearing device are described. Each of those features can be provided solely or in combination with at least another feature. The features can be correspondingly provided in some implementations of the method and/or the hearing device.

In some implementations, the performance index has at least one dimension comprising a dimension indicative of an impact of the audio processing algorithm on resources available in the hearing device; and/or a dimension indicative of an enhancement of the hearing perception of the user by the processing of the audio signal; and/or a dimension indicative of an adverse effect of the processing of the audio signal for the hearing perception of the user.

In some implementations, the impact of the audio processing algorithm on available resources comprises at least one of a power consumption of the algorithm, e.g., relative to a life of a battery included in the hearing device;

a computational load of executing the algorithm;

a memory requirement of the algorithm; and a communication bandwidth required to execute the algorithm in a distributed processor comprising at least two processing units communicating with each other.

In some implementations, the enhancement of the hearing perception of the user comprises at least one of a measure of a clarity of sound encoded in the audio signal;

a measure of an understandability of a speech encoded in the audio signal;

a measure of a listening effort needed for understanding information encoded in the audio signal;

a measure of a comfort when listening to sound encoded in the audio signal;

a measure of a naturalness of sound encoded in the audio signal;

a measure of a spatial perceptibility of sound encoded in the audio signal; and a measure of a quality of sound encoded in the audio signal.

In some implementations, the adverse effect of the processing comprises at least one of a level of artefacts in the processed audio signal;

a level of distortions of sound encoded in the processed audio signal; and a level of a latency for outputting the output audio signal based on the processed audio signal.

In some implementations, the determining the target index comprises at least one of receiving, from a user interface, a user command indicative of the target index;

evaluating the audio signal, wherein the target index is determined based on the evaluated audio signal;

receiving, from a sensor included in the hearing device, sensor data, wherein the target index is determined based on the sensor data; and acquiring information about resources available in the hearing device, wherein the target index is determined based on the information.

In some implementations, the target index is indicative of an applicability of the audio processing algorithms for a processing of the audio signal. The target index may then also be referred to as an applicability index. E.g., the target index may constrain the applicability of the audio processing algorithms. The target index may then also be referred to as a constraint index.

In some implementations, the method further comprises classifying the audio signal by attributing at least one class from a plurality of predetermined classes to the audio signal, wherein the target index is determined depending on the class attributed to the audio signal.

In some implementations, the user command is indicative of a value desired by the user of the performance index. E.g., the user command may be indicative of a value desired by the user of the performance index in at least one of said dimensions.

In some implementations, the different audio processing algorithms comprise at least two audio processing algorithms configured to provide for the same signal processing goal which are associated with a differing performance index, wherein the signal processing goal comprises at least one of an enhancement of a speech content of a single talker in the audio signal;

an enhancement of a speech content of a plurality of talkers in the audio signal;

a reproduction of sound emitted by an acoustic object in the environment of the user encoded in the audio signal;

a reproduction of sound emitted by a plurality of acoustic objects in the environment of the user encoded in the audio signal;

a reduction and/or cancelling of noise and/or reverberations in the audio signal;

a preservation of acoustic cues contained in the audio signal;

a suppression of noise in the audio signal;

an improvement of a signal to noise ratio (SNR) in the audio signal;

a spatial resolution of sound encoded in the audio signal depending on a direction of arrival (DOA) of the sound and/or depending on a location of at least one acoustic object emitting the sound in the environment of the user;

a directivity of an audio content in the audio signal provided by a beamforming or a preservation of an omnidirectional audio content in the audio signal;

an amplification of sound encoded in the audio signal adapted to an individual hearing loss of the user; and an enhancement of music content in the audio signal.

E.g., the performance index may be differing in one or more of said dimensions.

In some implementations, the different audio processing algorithms comprise a first set of audio processing algorithms and a second set of audio processing algorithms, wherein at least one of the audio processing algorithms of the first set and at least one of the audio processing algorithms of the second set are configured to provide for the same signal processing goal and are associated with a differing performance index. E.g., the performance index may be differing in one or more of said dimensions.

In some implementations, depending on the target index, at least two of the audio processing algorithms of the first set or the second set are selected to be applied in a sequence and/or in parallel on the audio signal to generate the processed audio signal.

In some implementations, at least one of the audio processing algorithms is included in the first set and in the second set.

In some implementations, the first set and the second set are associated with a performance index indicative of the performance index of each of the audio processing algorithms included in the set.

In some implementations, the audio processing algorithms comprise at least one neural network (NN).

In some implementations, the NN comprises an encoder part configured to encode the audio signal, and a decoder part configured to decode the encoded audio signal.

In some implementations, the different audio processing algorithms comprise a first NN comprising the encoder part and a first decoder part, and a second NN comprising the encoder part and a second decoder part differing from the first decoder part, wherein the first NN and the second NN are associated with a differing performance index. E.g., the performance index may be differing in one or more of said dimensions.

In some implementations, the first set of audio processing algorithms comprises the first NN, and the second set of audio processing algorithms comprises the second NN.

In some implementations, the audio signal is indicative of a sound in the ambient environment of the user. In some implementations, the audio signal is received from an input transducer, e.g., a microphone or a microphone array, included in the hearing device. In some implementations, the audio signal is received by an audio signal receiver included in the hearing device, e.g., via radio frequency (RF) communication. In some implementations, the audio signal is received from a remote microphone, e.g., a table microphone and/or a clip-on microphone.

FIG. 1 illustrates an exemplary hearing device 110 configured to be worn at an car of a user. Hearing device 110 may be implemented by any type of hearing device configured to enable or enhance hearing or a listening experience of a user wearing hearing device 110. For example, hearing device 110 may be implemented by a hearing aid configured to provide an amplified version of audio content to a user, a sound processor included in a cochlear implant system configured to provide electrical stimulation representative of audio content to a user, a sound processor included in a bimodal hearing system configured to provide both amplification and electrical stimulation representative of audio content to a user, or any other suitable hearing prosthesis, or an earbud or an earphone or a hearable.

Different types of hearing device 110 can also be distinguished by the position at which they are worn at the ear. Some hearing devices, such as behind-the-ear (BTE) hearing aids and receiver-in-the-canal (RIC) hearing aids, typically comprise an earpiece configured to be at least partially inserted into an ear canal of the ear, and an additional housing configured to be worn at a wearing position outside the ear canal, in particular behind the ear of the user. Some other hearing devices, as for instance earbuds, earphones, hearables, in-the-ear (ITE) hearing aids, invisible-in-the-canal (IIC) hearing aids, and completely-in-the-canal (CIC) hearing aids, commonly comprise such an earpiece to be worn at least partially inside the ear canal without an additional housing for wearing at the different ear position.

As shown, hearing device 110 includes a processor 112 communicatively coupled to a memory 113, an audio input unit 114, and an output transducer 117. Audio input unit 114 may comprise at least one input transducer 115 and/or an audio signal receiver 116 configured to provide an input audio signal. Hearing device 110 may further include a communication port 119. Hearing device 110 may further include a sensor unit 118 communicatively coupled to processor 112. Hearing device 110 may include additional or alternative components as may serve a particular implementation. Input transducer 115 may be implemented by any suitable device configured to detect sound in the environment of the user and to provide an input audio signal indicative of the detected sound, e.g., a microphone or a microphone array. Output transducer 117 may be implemented by any suitable audio transducer configured to output an output audio signal to the user, for instance a receiver of a hearing aid, an output electrode of a cochlear implant system, or a loudspeaker of an earbud.

Processor 112 is configured to receive, from audio input unit 114, an input audio signal. E.g., when the audio signal is received from input transducer 115, the audio signal may be indicative of a sound detected in the environment of the user and/or, when the audio signal is received from audio signal receiver 116, the audio signal may be indicative of a sound provided from a remote audio source such as, e.g., a remote microphone and/or an audio streaming server. Processor 112 is further configured to process the audio signal by at least one audio processing algorithm to generate a processed audio signal; and to control output transducer 117 to output an output audio signal based on the processed audio signal so as to stimulate the user's hearing.

Processor 112 is also configured to provide different audio processing algorithms each configured to be applied on the audio signal and indicative of a performance of the audio processing algorithm when applied on the audio signal. Processor 112 is further configured to determine a target index relative to the performance index, to select, depending on the target index, at least one of the processing algorithms, and to apply the selected processing algorithm on the audio signal. These and other operations, which may be performed by processor 112, are described in more detail in the description that follows.

Memory 113 may be implemented by any suitable type of storage medium and is configured to maintain, e.g. store, data controlled by processor 112, in particular data generated, accessed, modified and/or otherwise used by processor 112. For example, memory 113 may be configured to store instructions used by processor 112 to process the input audio signal received from input transducer 115, e.g., audio processing instructions in the form of one or more audio processing algorithms. The audio processing algorithms may comprise different audio processing instructions of processing the input audio signal received from input transducer 115 and/or audio signal receiver 116. For instance, the audio processing algorithms may provide for at least one of a gain model (GM) defining an amplification characteristic, a noise cancelling (NC) algorithm, a wind noise cancelling (WNC) algorithm, a reverberation cancelling (RevC) algorithm, a feedback cancelling (FC) algorithm, a speech enhancement (SE) algorithm, a gain compression (GC) algorithm, a noise cleaning algorithm, a binaural synchronization (BS) algorithm, a beamforming (BF) algorithm, in particular static and/or adaptive beamforming, and/or the like. Further examples of audio processing algorithms, which may be stored in memory 113 and/or applied by processor 112, are described in the following description. A plurality of the audio processing algorithms may be executed by processor 112 in a sequence and/or in parallel to generate a processed audio signal.

As another example, memory 113 may be configured to store instructions used by processor 112 to classify the input audio signal received from input transducer 115 and/or audio signal receiver 116 by attributing at least one class from a plurality of predetermined sound classes to the input audio signal. Exemplary classes may include, but are not limited to, low ambient noise, high ambient noise, traffic noise, music, machine noise, babble noise, public area noise, background noise, speech, nonspeech, speech in quiet, speech in babble, speech in noise, speech from the user, speech from a significant other, background speech, speech from multiple sources, quiet indoor, quiet outdoor, speech in a car, speech in traffic, speech in a reverberating environment, speech in wind noise, speech in a lounge, car noise, applause, music, e.g. classical music, and/or the like. In some instances, the different audio processing instructions can be associated with different classes.

Memory 113 may comprise a non-volatile memory from which the maintained data may be retrieved even after having been power cycled, for instance a flash memory and/or a read only memory (ROM) chip such as an electrically erasable programmable ROM (EEPROM). A non-transitory computer-readable medium may thus be implemented by memory 113. Memory 113 may further comprise a volatile memory, for instance a static or dynamic random access memory (RAM).

As illustrated, hearing device 110 may further comprise a communication port 119. Communication port 119 may be implemented by any suitable data transmitter and/or data receiver and/or data transducer configured to exchange data with another device. For instance, the other device may be another hearing device configured to be worn at the other car of the user than hearing device 110 and/or a communication device such as a smartphone, smartwatch, tablet and/or the like. Communication port 119 may be configured for wired and/or wireless data communication. For instance, data may be communicated in accordance with a Bluetooth™ protocol and/or by any other type of radio frequency (RF) communication.

As illustrated, hearing device 110 may further comprise an audio signal receiver 116. Audio signal receiver 116 may be implemented by any suitable data receiver and/or data transducer configured to receive an input audio signal from a remote audio source. For instance, the remote audio source may be a wireless microphone, such as a table microphone, a clip-on microphone and/or the like, and/or a portable device, such as a smartphone, smartwatch, tablet and/or the like, and/or any another data transceiver configured to transmit the input audio signal to audio signal receiver 116. E.g., the remote audio source may be a streaming source configured for streaming the input audio signal to audio signal receiver 116. Audio signal receiver 116 may be configured for wired and/or wireless data reception of the input audio signal. For instance, the input audio signal may be received in accordance with a Bluetooth™ protocol and/or by any other type of radio frequency (RF) communication.

As illustrated, hearing device 110 may comprise a sensor unit 118 comprising at least one further sensor communicatively coupled to processor 112 in addition to input transducer 115. Some examples of a sensor which may be implemented in sensor unit 118 are illustrated in FIG. 2.

Figure 2:
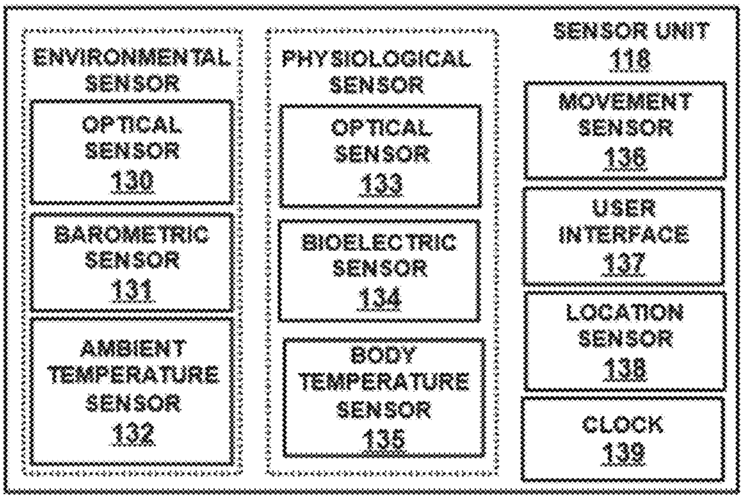
FIG. 2 schematically illustrates an exemplary sensor unit comprising one or more sensors which may be implemented in the hearing device illustrated in FIG. 1.

As illustrated in FIG. 2, sensor unit 118 may include at least one environmental sensor configured to provide environmental data indicative of a property of the environment of the user in addition to input transducer 115, for example an optical sensor 130 configured to detect light in the environment and/or a barometric sensor 131 and/or an ambient temperature sensor 132. Sensor unit 118 may include at least one physiological sensor configured to provide physiological data indicative of a physiological property of the user, for example an optical sensor 133 and/or a bioelectric sensor 134 and/or a body temperature sensor 135. Optical sensor 133 may be configured to emit the light at a wavelength absorbable by an analyte contained in blood such that the physiological sensor data comprises information about the blood flowing through tissue at the car. E.g., optical sensor 133 can be configured as a photoplethysmography (PPG) sensor such that the physiological sensor data comprises PPG data, e.g. a PPG waveform. Bioelectric sensor 134 may be implemented as a skin impedance sensor and/or an electrocardiogram (ECG) sensor and/or an electroencephalogram (EEG) sensor and/or an electrooculography (EOG) sensor.

Sensor unit 118 may include a movement sensor 136 configured to provide movement data indicative of a movement of the user, for example an accelerometer and/or a gyroscope and/or a magnetometer. Sensor unit 118 may include a user interface 137 configured to provide interaction data indicative of an interaction of the user with hearing device 110, e.g., a touch sensor and/or a push button. Sensor unit 118 may include at least one location sensor 138 configured to provide location data indicative of a current location of the user, for instance a GPS sensor. Sensor unit 118 may include at least one clock 139 configured to provide time data indicative of a current time. Context data may be defined as data indicative of a local and/or temporal context of the data provided by other sensors 115, 131-137. Context data may comprise the location data and/or the time data provided by location sensor 138 and/or clock 139. Context data may also be received from an external device via communication port 119, e.g., from a communication device. E.g., one or more of sensors 115, 131-137 may then be included in the communication device. Sensor unit 118 may include further sensors providing sensor data indicative of a property of the user and/or the environment and/or the context.

Figure 3:
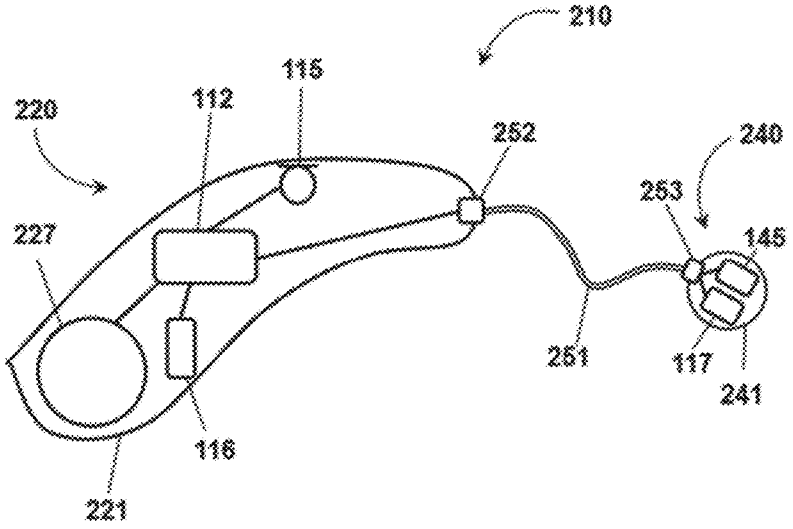
FIG. 3 schematically illustrates an embodiment of the hearing device illustrated in FIG. 1 as a RIC hearing aid.

FIG. 3 illustrates an exemplary implementation of hearing device 110 as a RIC hearing aid 210. RIC hearing aid 210 comprises a BTE part 220 configured to be worn at an car at a wearing position behind the car, and an ITE part 240 configured to be worn at the car at a wearing position at least partially inside an car canal of the car. BTE part 220 comprises a BTE housing 221 configured to be worn behind the car. BTE housing 221 accommodates processor 112 communicatively coupled to input transducer 115 and audio signal receiver 116. BTE part 220 further includes a battery 227 as a power source. ITE part 240 is an earpiece comprising an ITE housing 241 at least partially insertable in the car canal. ITE housing 241 accommodates output transducer 117. ITE part 240 may further include an in-the-car input transducer 145, e.g., an car canal microphone, configured to detect sound inside the car canal and to provide an in-the-car audio signal indicative of the detected sound. BTE part 220 and ITE part 240 are interconnected by a cable 251. Processor 112 is communicatively coupled to output transducer 117 and to in-the-car input transducer 145 of ITE part 240 via cable 251 and cable connectors 252, 253 provided at BTE housing 221 and ITE housing 241. In some implementations, at least one of sensors 130-139 is included in BTE part 220 and/or ITE part 240.

Figure 4:
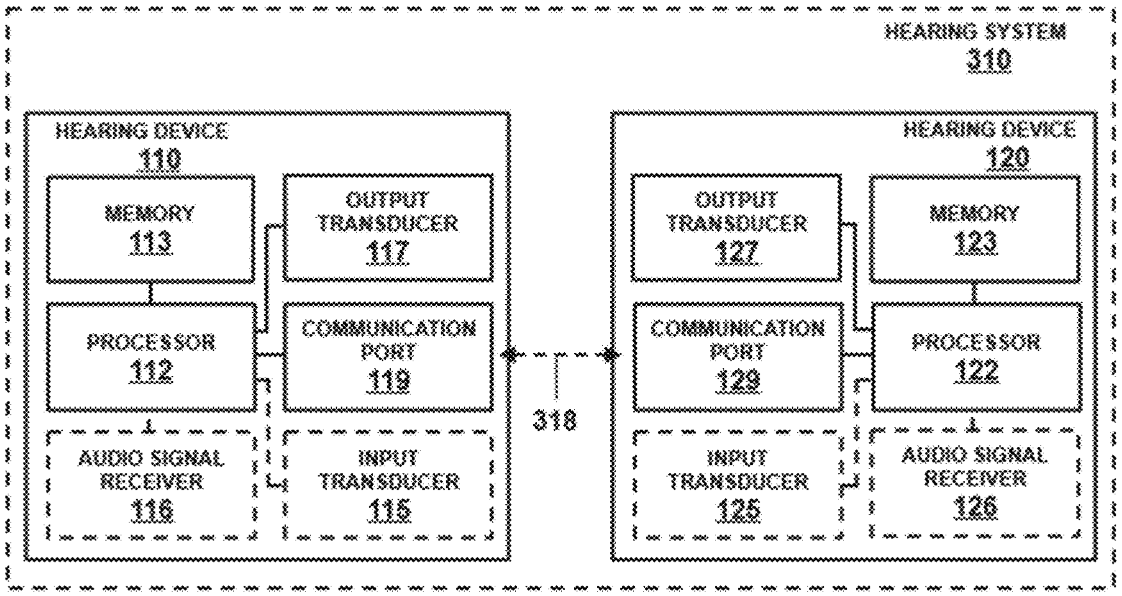
FIG. 4 schematically illustrates an exemplary hearing system comprising two hearing devices configured to be worn at two different ears of a user.

FIG. 4 illustrates an exemplary hearing system 310 comprising first hearing device 110 configured to be worn at a first car of the user, and a second hearing device 120 configured to be worn at a second car of the user. Hearing system 310 may also be denoted as a binaural hearing device. Second hearing device 120 may be implemented corresponding to first hearing device 110. E.g., first hearing device 110 and second hearing device 120 may each be implemented corresponding to RIC hearing aid 210 described above. As shown, second hearing device 120 includes a processor 122 communicatively coupled to a memory 123, an output transducer 127, an audio input unit 124, which may comprise at least one input transducer corresponding to input transducer 115 and/or at least one audio signal receiver corresponding to audio signal receiver 116. Second hearing device 120 further includes a communication port 129.

Processor 112 of first hearing device 110 and processor 122 of second hearing device 120 can be communicatively coupled by communication ports 119, 129 via a communication link 318. In this way, processor 112 of first hearing device 110 may form a first processing unit and processor 122 of second hearing device may form a second processing unit of a processor comprising the first processing unit 112 and the second processing unit 122. For instance, processor 112, 122 may then be implemented as a distributed processing system of first processing unit 112 and second processing unit 122 and/or may operate in a master-slave configuration of first processing unit 112 and second processing unit 122. Hearing system 310 may further comprise a portable device, e.g., a communication device such as a smartphone, smartwatch, tablet and/or the like. The portable device, in particular a processor included in the portable device, may also be communicatively coupled to processors 112, 122, e.g., via communication ports 119, 129.

Figure 5:
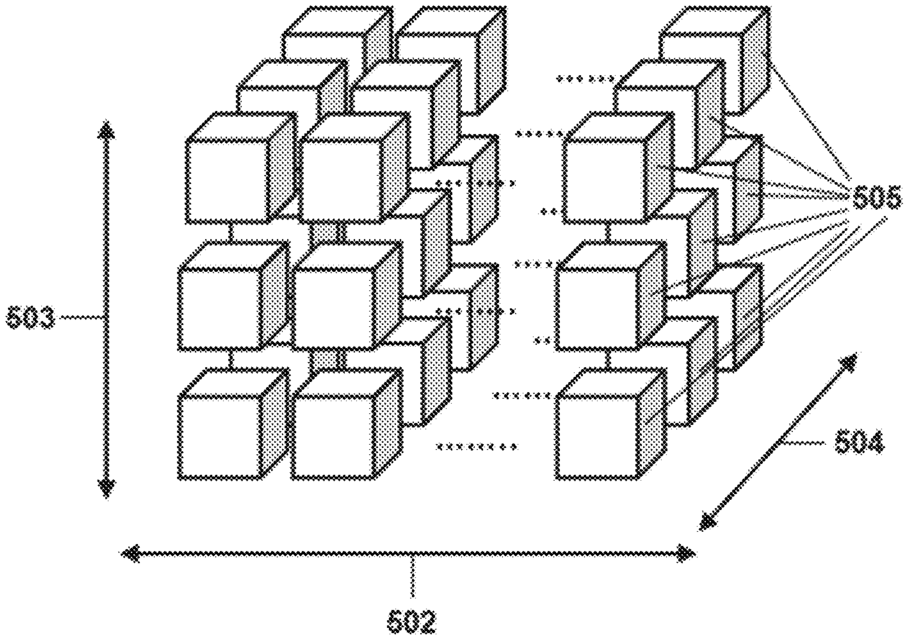
FIG. 5 schematically illustrates different audio processing algorithms.

FIG. 5 illustrates an abstract view of different audio processing algorithms 505 which may be executed by processor 112 and/or processor 122 to be applied on an audio signal. As illustrated, audio processing algorithms 505 can be organized in at least one dimension 502, 503, 504. The dimensions can include a dimension 502 indicative of an impact of the respective audio processing algorithm 505 on resources available in hearing device 110, 120, 210, a dimension 503 indicative of an enhancement of the hearing perception of the user by the processing of the audio signal, and a dimension 504 indicative of an adverse effect of the processing of the audio signal for the hearing perception of the user. A performance index associated with each of the different audio processing algorithms 505, which may be indicative of a performance of the respective audio processing algorithm 505 when applied on the audio signal, may be defined as an index having at least one of dimensions 502-504.

To illustrate, dimension 502 indicative of an impact of the respective audio processing algorithm 505 on resources available in hearing device 110, 120, 210 may be indicative of at least one of a power consumption of the respective algorithm, thus affecting a life of battery 227 included in hearing device 110, 120, 210, a computational load of executing the algorithm, e.g., with regard to an available processing power of any of processor 112, 122, a memory requirement of the algorithm, e.g., of available volatile and/or non-volatile memory which may be used or accessed during execution of the respective algorithm 505 by processor 112, 122, and a communication bandwidth required to execute the respective algorithm 505, e.g., in a distributed processor comprising at least two processing units 112, 122 communicating with each other via communication ports 119, 129.

Dimension 503 indicative of an enhancement of the hearing perception of the user by the processing of the audio signal by the respective algorithm 505 may be indicative of at least one of a measure of a clarity of sound encoded in the audio signal; a measure of an understandability of a speech encoded in the audio signal; a measure of a listening effort needed for understanding information encoded in the audio signal; a measure of a comfort when listening to sound encoded in the audio signal; a measure of a naturalness of sound encoded in the audio signal; a measure of a spatial perceptibility of sound encoded in the audio signal; and a measure of a quality of sound encoded in the audio signal.

Dimension 504 indicative of an adverse effect of the processing of the audio signal by the respective algorithm 505 for the hearing perception of the user may be indicative of at least one of a level of artefacts in the processed audio signal, which may be caused by the processing by the respective algorithm 505; a level of distortions of sound encoded in the audio signal, which may be caused by the processing by the respective algorithm 505; and a level of a latency for outputting the output audio signal based on the processed audio signal, which may be caused by the processing by the respective algorithm 505.

Figure 6:
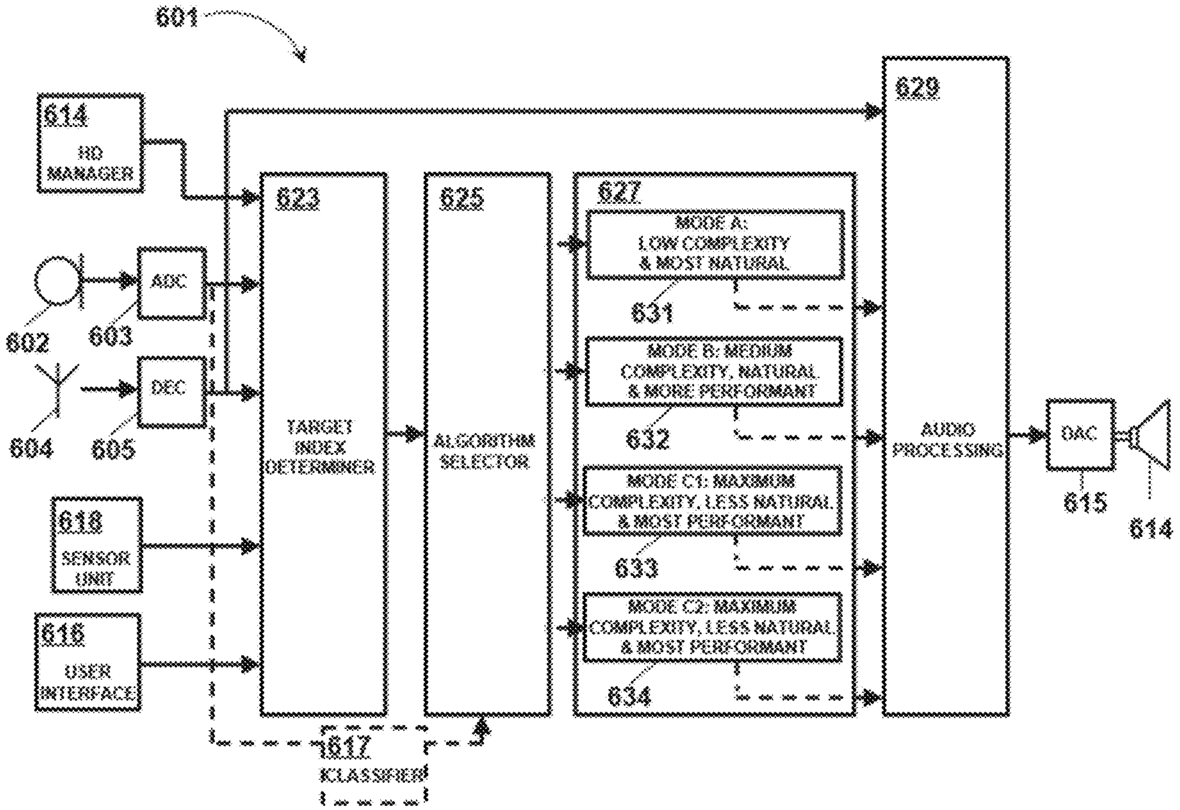
FIG. 6 schematically illustrates an exemplary arrangement of processing an audio signal according to principles described herein.

FIG. 6 illustrates a functional block diagram of an exemplary audio signal processing arrangement 601 that may be implemented by hearing device 110, 210 and/or hearing system 310. Arrangement 601 comprises at least one input transducer 602, which may be implemented by input transducer 115, 125, and/or at least one audio signal receiver 604, which may be implemented by audio signal receiver 116, 126. The audio signal provided by input transducer 602 may be an analog signal. The analog signal may be converted into a digital signal by an analog-to-digital converter (ADC) 603. The audio signal provided by audio signal receiver 604 may be an encoded signal. The encoded signal may be decoded into a decoded signal by a decoder (DEC) 605. Arrangement 501 further comprises at least one output transducer 614, which may be implemented by output transducer 117, 127. Arrangement 601 may further comprise at least one user input unit 616 and/or sensor unit 618, which may be implemented by user interface 137 and/or at least one of sensors 130-136, 138, 139 included in sensor unit 118. Arrangement 601 further comprises a hearing device management module 614. Hearing device management module 614 can be configured to acquire information about resources currently available in hearing device 110, 210.

Arrangement 601 may further comprise a classifier 617. Classifier 617 can be configured to attribute at least one class to the audio signal provided by input transducer 602 and/or audio signal receiver 604 and/or at least one class to sensor data provided by sensor unit 618. E.g., when the class is attributed to the audio signal, the class attributed to the audio signal may include at least one of low ambient noise, high ambient noise, traffic noise, music, machine noise, babble noise, public area noise, background noise, speech, non-speech, speech in quiet, speech in babble, speech in noise, speech from the user, speech from a significant other, background speech, speech from multiple sources, quiet indoor, quiet outdoor, speech in a car, speech in traffic, speech in a reverberating environment, speech in wind noise, speech in a lounge, car noise, applause, music, e.g. classical music, and/or the like is attributed to the audio signal. E.g., when the class is attributed to the sensor data, which may be provided by movement sensor 136, attributed to the movement data may comprise at least one of the user walking, running, standing, the user turning his head, and the user falling to the ground.

Arrangement 601 further comprises a target index determination module 623, an audio processing algorithm selection module 625, an audio processing algorithm storage module 627, and an audio processing module 629. Modules 623, 625, 627, 629 may be executed by at least one processor 112, 122, e.g., by a processing unit including processor 112 of first hearing device 110 and/or processor 122 of second hearing device 120. Additionally or alternatively, audio processing algorithm storage module 627 may be provided by at least one memory, e.g., by memory 113 of first hearing device 110 and/or memory 123 of second hearing device 120.

As illustrated, the audio signal provided by input transducer 602, after it has been converted into a digital signal by analog-to-digital converter 603, and/or the audio signal provided by audio signal receiver 604, after it has been decoded by decoder 605, can be received by audio processing module 629. Audio processing module 629 is configured to process the audio signal by applying one or more audio processing algorithms on the audio signal to generate a processed audio signal. In a case in which a plurality of audio processing algorithms are applied on the audio signal, the audio processing algorithms may be executed in a sequence and/or in parallel to generate the processed audio signal. Based on the processed audio signal, an output audio signal can be output by output transducer 614 so as to stimulate the user's hearing. To this end, the processed audio signal may be converted into an analog signal by a digital-to-analog converter (DAC) 615 before providing the processed audio signal to output transducer 614.

Audio processing algorithm storage module 627 is configured to store a plurality of different audio processing algorithms. Each of the audio processing algorithms is configured to be applied on the audio signal by audio processing module 629. Further, each of the audio processing algorithms is associated with a performance index indicative of a performance of the audio processing algorithm when applied on the audio signal. E.g., the different audio processing algorithms may include audio processing algorithms 505 described above. Each of audio processing algorithms 505 may then be associated with a performance index having at least one of dimensions 502-504. For instance, audio processing algorithm storage module 627 may comprise a volatile and/or involatile memory to store audio processing algorithms 505, e.g., memory 113, 123. Additionally or alternatively, audio processing algorithm storage module 627 may comprise an internal memory, e.g., a volatile memory, included in processor 112, 122.

For example, audio processing algorithms 505 which may be stored by audio processing algorithm storage module 627 and/or applied on the audio signal by audio processing module 629, may comprise at least one of a gain model (GM), which may define an amplification characteristic, e.g., to compensate for an individual hearing loss of the user; a noise cancelling (NC) algorithm; a wind noise cancelling (WNC) algorithm; a reverberation cancelling (RevC) algorithm; a feedback cancelling (FC) algorithm; a speech enhancement (SE) algorithm; an impulse noise cancelling (INC) algorithm; an acoustic object separation (AOS) algorithm; a binaural synchronization (BS) algorithm; and a beamforming (BF) algorithm, in particular adapted for static and/or adaptive beamforming. Further examples of audio processing algorithms 505 are described in the following description.

The gain model (GM) may comprise a gain compression (GC) algorithm which may be configured to provide for an amplification characteristic of the input audio signal which may depend on a loudness level of the audio content in the input audio signal. E.g., the amplification may be decreased, e.g., limited, for audio content having a higher signal level and/or the amplification may be increased, e.g., expanded, for audio content having a lower signal level. An operation of the gain compression (GC) algorithm may also be adjusted depending on a user command received from user interface 616 and/or when classifier 617 attributes at least one class to the audio signal. The gain model (GM) may also comprise a frequency compression (FreqC) algorithm which may be configured to provide for an amplification characteristic of the input audio signal which may depend on a frequency of the audio content in the input audio signal, e.g., to provide for audio content detected at higher frequencies an amplification shifted to a lower frequency band.

Some examples of different GC algorithms may comprise a low delay compression ratio (CR)/gain algorithm, which may provide for the gain compression in a more basic manner, and/or an advanced CR/gain algorithm, which may provide for the gain compression in a more sophisticated manner. The different GC algorithms may thus be each associated with a performance index differing in at least one of dimensions 502-504. To illustrate, the different GC algorithms may differ in dimension 502 indicative of an impact of the respective audio processing algorithm 505 on resources available in hearing device 110, 120, 210 due to an increasing power consumption and/or computational load and/or memory requirement and/or communication bandwidth when executing the advanced CR/gain algorithm in place of the low delay compression ratio (CR)/gain algorithm. Further, the different NC algorithms may differ in dimension 503 indicative of an enhancement of the hearing perception of the user achieved by the processing of the audio signal due to an improved gain compression and/or improved quality of the audio signal when executing the advanced CR/gain algorithm in place of the low delay compression ratio (CR)/gain algorithm, which may affect the listening effort and/or comfort and/or naturalness and/or other quality of the sound encoded in the audio signal. Further, the different NC algorithms may differ in dimension 504 indicative of an adverse effect of the processing of the audio signal by the respective algorithm 505 for the hearing perception of the user due to an increasing level of artefacts and/or distortions and/or latency when executing the advanced CR/gain algorithm in place of the low delay compression ratio (CR)/gain algorithm. Other examples of different GM algorithms may comprise an expansion algorithm, which may provide for a level expansion and/or a frequency expansion in the audio signal, and/or a maximum power output (MPO) algorithm, which may control a maximum power output.

The noise cancelling (NC) algorithm can be configured to provide for a cancelling and/or suppression and/or cleaning of noise contained in the audio signal. In some instances, the NC algorithm may be applied depending on the audio signal provided by input transducer 602 and/or the audio signal provided by audio signal receiver 604. For instance, the NC algorithm may be applied on the audio signal by audio processing module 629 when classifier 617 attributes at least one class such as low ambient noise, high ambient noise, traffic noise, noise, babble noise, public area noise, background noise, speech, nonspeech, speech in quiet, speech in noise, speech in loud noise, speech in traffic, car noise, applause, and/or the like to the audio signal. A corresponding signal processing goal of the cancelling and/or suppression and/or cleaning of wind noise in the audio signal may thus be predicted based on a class attributed to the audio signal. The NC algorithm may also be applied depending on a user command, which may be provided by user interface 616, and/or sensor data, which may be provided by sensor unit 618.

Some examples of different noise cancelling (NC) algorithms may comprise a low delay NC algorithm, which may provide for the noise cancelling in a non-spatially resolved manner, and/or a traditional/hybrid NC algorithm, which may provide for a non-spatially resolved noise cancelling in a more sophisticated manner, and/or a directional NC algorithm, which may provide for the noise cancelling in a specific direction or location relative to the user, e.g., toward the front of the user, which may also be referred to as a front NC algorithm, and/or a denoising algorithm implemented by a neural network (NN), e.g., a deep neural network (DNN), which may also provide for the noise cancelling in a non-spatial manner.

The different NC algorithms may thus be each associated with a performance index differing in at least one of dimensions 502-504. To illustrate, the different NC algorithms may differ in dimension 502 indicative of an impact of the respective audio processing algorithm 505 on resources available in hearing device 110, 120, 210 due to an increasing power consumption and/or computational load and/or memory requirement and/or communication bandwidth when executing the directional NC algorithm in place of the low delay NC algorithm and/or when executing the denoising algorithm implemented by a NN in place of the low delay NC algorithm and/or the directional NC algorithm. Further, the different NC algorithms may differ in dimension 503 indicative of an enhancement of the hearing perception of the user achieved by the processing of the audio signal due to an increasing amount of the noise cancelling and/or improved quality of the audio signal when executing the directional NC algorithm in place of the low delay NC algorithm and/or when executing the denoising algorithm implemented as a NN in place of the low delay NC algorithm and/or the directional NC algorithm, which may affect the listening effort and/or comfort and/or naturalness and/or other quality of the sound encoded in the audio signal. Further, the different NC algorithms may differ in dimension 504 indicative of an adverse effect of the processing of the audio signal by the respective algorithm 505 for the hearing perception of the user due to an increasing level of artefacts and/or distortions and/or latency when executing the directional NC algorithm in place of the low delay NC algorithm and/or when executing the denoising algorithm implemented by a NN in place of the low delay NC algorithm and/or the directional NC algorithm.

The wind noise cancelling (WNC) algorithm can be configured to provide for a cancelling and/or suppression and/or cleaning of wind noise contained in the audio signal. In some instances, the WNC algorithm may be applied depending on the audio signal provided by input transducer 602 and/or the audio signal provided by audio signal receiver 604. For instance, the WNC algorithm may be applied on the audio signal by audio processing module 629 when classifier 617 attributes at least one class such as wind noise to the audio signal. A corresponding signal processing goal of the cancelling and/or suppression and/or cleaning of wind noise in the audio signal may thus be predicted based on a class attributed to the audio signal. The WNC algorithm may also be applied depending on a user command, which may be provided by user interface 616, and/or sensor data, which may be provided by sensor unit 618.

The reverberation cancelling (RevC) algorithm can be configured to provide for a cancelling and/or suppression and/or cleaning of reverberations contained in the audio signal. In some instances, the RevC algorithm may be applied depending on the audio signal provided by input transducer 602 and/or the audio signal provided by audio signal receiver 604. For instance, the RevC algorithm may be applied on the audio signal by audio processing module 629 when classifier 617 attributes at least one class such as reverberations and/or speech in a reverberating environment and/or the like to the audio signal. A corresponding signal processing goal of the cancelling and/or suppression and/or cleaning of reverberations in the input audio signal may thus be predicted based on a class attributed to the audio signal. The RevC algorithm may also be applied depending on a user command, which may be provided by user interface 616, and/or sensor data, which may be provided by sensor unit 618.

The feedback cancelling (FC) algorithm can be configured to provide for a cancelling and/or suppression and/or cleaning of feedback contained in the audio signal. For instance, the feedback cancelling (FC) algorithm may be executed by default by audio processing module 629, e.g., to account for a previously known signal processing goal to compensate for the feedback which may be present in the audio signal. The FC algorithm may also be applied depending on the audio signal provided by input transducer 602 and/or the audio signal provided by audio signal receiver 604, e.g., when feedback has been determined to be contained in the audio signal. The FC algorithm may also be applied depending on a user command, which may be provided by user interface 616, and/or sensor data, which may be provided by sensor unit 618.

Some examples of different FC algorithms may comprise a low delay FC management algorithm, and an FC algorithm providing for frequency shift and/or phase cancelling. The different FC algorithms may thus be each associated with a performance index differing in at least one of dimensions 502-504. To illustrate, the different FC algorithms may differ in dimension 502 indicative of an impact of the respective audio processing algorithm 505 on resources available in hearing device 110, 120, 210 due to an increasing power consumption and/or computational load and/or memory requirement and/or communication bandwidth when executing the FC algorithm providing for frequency shift and/or phase cancelling in place of the low delay FC management algorithm. Further, the different FC algorithms may differ in dimension 503 indicative of an enhancement of the hearing perception of the user achieved by the processing of the audio signal due to an increasing amount of feedback suppression and/or better quality of the audio signal when executing the FC algorithm providing for frequency shift and/or phase cancelling in place of the low delay FC management algorithm, which may affect the listening effort and/or comfort and/or naturalness and/or another quality of the sound encoded in the audio signal. Further, the different NC algorithms may differ in dimension 504 indicative of an adverse effect of the processing of the audio signal by the respective algorithm 505 for the hearing perception of the user due to an increasing level of artefacts and/or distortions and/or latency when executing the FC algorithm providing for frequency shift and/or phase cancelling in place of the low delay FC management algorithm.

The speech enhancement (SE) algorithm can be configured to provide for an enhancement and/or amplification and/or augmentation of speech contained in the audio signal. In some instances, the SE algorithm may be applied depending on the audio signal provided by input transducer 602 and/or the audio signal provided by audio signal receiver 604. For instance, the SE algorithm may be applied on the audio signal by audio processing module 629 when classifier 617 attributes at least one class such as speech, speech in quiet, speech in babble, speech in noise, speech from the user, speech from a significant other, background speech, speech from multiple sources, speech in a car, speech in traffic, speech in a reverberating environment, speech in wind noise, speech in a lounge to the audio signal. A corresponding signal processing goal of the enhancement and/or amplification and/or augmentation of speech contained in the input audio signal may thus be predicted based on a class attributed to the audio signal. The SE algorithm may also be applied depending on a user command, which may be provided by user interface 616, and/or sensor data, which may be provided by sensor unit 618.

Some examples of different SE algorithms may comprise a low delay soft SE algorithm, which may provide for an enhancement of soft speech content in the audio signal, a soft SE algorithm, which may provide for an enhancement of soft speech content in the audio signal in a more sophisticated manner, and/or a general SE algorithm, which may provide for an enhancement of general speech content in the audio signal. In particular, the SE algorithm, e.g., the soft SE algorithm and/or the general SE algorithm, may be provided as a non-spatial SE algorithm, which may be configured to provide for speech enhancement in a non-directional manner, and/or as a spatial SE algorithm, which may be configured to provide for speech enhancement in a directional manner.

The different SE algorithms may thus be each associated with a performance index differing in at least one of dimensions 502-504. To illustrate, the different SE algorithms may differ in dimension 502 indicative of an impact of the respective audio processing algorithm 505 on resources available in hearing device 110, 120, 210 due to an increasing power consumption and/or computational load and/or memory requirement and/or communication bandwidth when executing the soft SE enhancement algorithm and/or the general SE algorithm in place of the low delay soft SE enhancement algorithm. Further, the different SE algorithms may differ in dimension 503 indicative of an enhancement of the hearing perception of the user achieved by the processing of the audio signal due to an increasing amount and/or quality of the speech enhancement when executing the soft SE enhancement algorithm and/or the general SE algorithm in place of the low delay soft SE enhancement algorithm, which may affect the listening effort and/or comfort and/or naturalness and/or another quality of the sound encoded in the audio signal. Further, the different SE algorithms may differ in dimension 504 indicative of an adverse effect of the processing of the audio signal by the respective algorithm 505 for the hearing perception of the user due to an increasing level of artefacts and/or distortions and/or latency when executing the soft SE enhancement algorithm and/or the general SE algorithm in place of the low delay soft SE enhancement algorithm.

The impulse noise cancelling (INC) algorithm may be configured to determine a presence of an impulse in the input audio signal and to reduce a signal level of the audio signal at the impulse, e.g., to reduce an occurrence of sudden loud sounds in the audio signal, which may be caused, e.g., by a shock on the hearing device, or wherein the signal may be kept at a level such that the sound remains audible by the user and/or, when an occurrence of speech is determined at the impulse, the signal level is not reduced. For instance, the INC algorithm may be executed by default by audio processing module 629, e.g., to account for a previously known signal processing goal to compensate for any impulse noise which may be present in the audio signal. The INC algorithm may also be applied depending on the audio signal provided by input transducer 602 and/or the audio signal provided by audio signal receiver 604, e.g., when an impulse has been determined to be contained in the audio signal. The INC algorithm may also be applied depending on a user command, which may be provided by user interface 616, and/or sensor data, which may be provided by sensor unit 618.

Some examples of different INC algorithms may comprise a low delay INC algorithm, which may provide for a basic impulse noise cancelling, and an INC algorithm, which may provide for impulse noise cancelling in a more sophisticated manner. The different INC algorithms may thus be each associated with a performance index differing in at least one of dimensions 502-504. To illustrate, the different INC algorithms may differ in dimension 502 indicative of an impact of the respective audio processing algorithm 505 on resources available in hearing device 110, 120, 210 due to an increasing power consumption and/or computational load and/or memory requirement and/or communication bandwidth when executing the INC algorithm in place of the low delay INC algorithm. Further, the different INC algorithms may differ in dimension 503 indicative of an enhancement of the hearing perception of the user achieved by the processing of the audio signal due to a decreased presence of impulse noise and/or improved quality of the audio signal when executing the INC algorithm in place of the low delay INC algorithm, which may affect the listening effort and/or comfort and/or naturalness and/or another quality of the sound encoded in the audio signal. Further, the different INC algorithms may differ in dimension 504 indicative of an adverse effect of the processing of the audio signal by the respective algorithm 505 for the hearing perception of the user due to an increasing level of artefacts and/or distortions and/or latency when executing the INC algorithm in place of the low delay INC algorithm.

The acoustic object separation (AOS) algorithm can be configured to separate audio content representative of sound emitted by at least one acoustic object from the input audio signal. More recently, one or more neural networks (NNs) have been employed to provide such a separation of sound emanated from one or more specific acoustic objects. In this regard, the AOS algorithm may be configured to separate the sound emanated from such an acoustic object by at least one deep neural network (DNN). In particular, the AOS algorithm may comprise an acoustic object separator configured to separate sound generated by different acoustic objects, for instance an own voice of the user, a conversation partner, passengers passing by the user, vehicles moving in the vicinity of the user such as cars, airborne traffic such as a helicopter, a sound scene in a restaurant, a sound scene including road traffic, a sound scene during public transport, a sound scene in a home environment, and/or the like. Examples of such an acoustic object separator are disclosed in international patent application Nos. PCT/EP 2020/051 734 and PCT/EP 2020/051 735, and in German patent application No. DE 2019 206 743.3. The separated audio content generated by the different acoustic objects can then be further processed, e.g., by emphasizing the audio content generated by one acoustic object relative to the audio content generated by another acoustic object and/or by suppressing the audio content generated by another acoustic object. For instance, separating an own voice of the user from the input audio signal may be employed different applications, e.g., a phone call and/or a steering of the hearing device and/or hearing system. E.g., a user command received via user interface 616 may include an input audio signal provided by input transducer 602. Separating the user's own voice from the input audio signal may then be employed to extract the user command from the input audio signal.

A corresponding signal processing goal of the audio content separation and/or emphasizing or suppressing dedicated acoustic objects in the input audio signal may be predicted based on the audio signal, e.g., depending on classifier 617 attributing at least one corresponding class to the audio signal, wherein such a classifier may be also be implemented by the acoustic object separator of the AOS algorithm. The AOS algorithm may also be applied depending on a user command, which may be provided by user interface 616, and/or sensor data, which may be provided by sensor unit 618.

The binaural synchronization (BS) algorithm can be configured to provide for a synchronization between an audio signal received from input transducer 115, 125, 502 in first hearing device 110 and from input transducer 115, 125, 502 in second hearing device 120 of hearing system 310, e.g., with regard to binaural cues indicative of a difference of a sound detected on a left and a right car of the user. In some instances, the BS algorithm may be applied depending on the audio signal provided by input transducer 602 and/or the audio signal provided by audio signal receiver 604. For instance, the BS algorithm may be applied on the audio signal by audio processing module 629 when classifier 617 attributes at least one class such as speech, nonspeech, speech in quiet, speech in babble, speech in noise, speech from the user, speech from a significant other, background speech, speech from multiple sources, speech in a car, speech in traffic, speech in a reverberating environment, speech in wind noise, speech in a lounge, music and/or the like to the input audio signal. A corresponding signal processing goal of the synchronization between an input audio signals may thus be predicted based on a class attributed to the audio signal. The BS algorithm may also be applied depending on a user command, which may be provided by user interface 616, and/or sensor data, which may be provided by sensor unit 618.

The beamforming (BF) algorithm can be configured to provide for a beamforming of audio content in the audio signal, e.g., with regard to a location of an acoustic object in the environment of the user and/or with regard to a direction of arrival (DOA) of sound detected by input transducer 115, 125, 502 and/or with regard to a directivity of the acoustic beam in a front and/or back direction of the user. In some instances, the BF algorithm may be applied depending on the audio signal provided by input transducer 602 and/or the audio signal provided by audio signal receiver 604. For instance, the BF algorithm may be applied on the audio signal by audio processing module 629 when classifier 617 attributes at least one class such as speech, nonspeech, speech in quiet, speech in babble, speech in noise, speech from the user, speech from a significant other, background speech, speech from multiple sources, speech in a car, speech in traffic, speech in a reverberating environment, speech in wind noise, speech in a lounge to the audio signal. A corresponding signal processing goal of the enhancement and/or amplification and/or augmentation of speech contained in the input audio signal may thus be predicted based on a class attributed to the audio signal. The BF algorithm may also be applied depending on a user command, which may be provided by user interface 616, and/or sensor data, which may be provided by sensor unit 618.

Some examples of different BF algorithms may comprise a low delay BF algorithm, which may provide for a directivity of an acoustic beam in a front direction of the user and/or a directivity in a rear direction of the user, a monaural BF algorithm, which may be adaptive, e.g., with regard a directivity and/or width of the acoustic beam, or static, and/or a guided BF algorithm, which may be configured to guide the beam to a side and/or back of the user, and/or a binaural BF algorithm, which may employ an audio signal received from input transducer 115 of first hearing device 110 and an audio signal received from input transducer 125 of second hearing device 120.

To illustrate, the different BF algorithms may differ in dimension 502 indicative of an impact of the respective audio processing algorithm 505 on resources available in hearing device 110, 120, 210 due to an increasing power consumption and/or computational load and/or memory requirement and/or communication bandwidth when executing the monaural BF algorithm and/or the binaural BF algorithm in place of the low delay BF algorithm and/or when executing the monaural adaptive BF algorithm and/or the binaural BF algorithm in place of the monaural static BF algorithm and/or when executing the binaural BF algorithm in place of the monaural BF algorithm. Further, the different BF algorithms may differ in dimension 503 indicative of an enhancement of the hearing perception of the user achieved by the processing of the audio signal due to an improved beamforming and/or quality of the audio signal when executing the monaural BF algorithm and/or the binaural BF algorithm in place of the low delay BF algorithm and/or when executing the monaural adaptive BF algorithm and/or the binaural BF algorithm in place of the monaural static BF algorithm and/or when executing the binaural BF algorithm in place of the monaural BF algorithm, which may affect the listening effort and/or comfort and/or naturalness and/or another quality of the sound encoded in the audio signal. Further, the different SE algorithms may differ in dimension 504 indicative of an adverse effect of the processing of the audio signal by the respective algorithm 505 for the hearing perception of the user due to an increasing level of artefacts and/or distortions and/or latency when executing the monaural BF algorithm and/or the binaural BF algorithm in place of the low delay BF algorithm and/or when executing the monaural adaptive BF algorithm and/or the binaural BF algorithm in place of the monaural static BF algorithm and/or when executing the binaural BF algorithm in place of the monaural BF algorithm.

Figure 7:
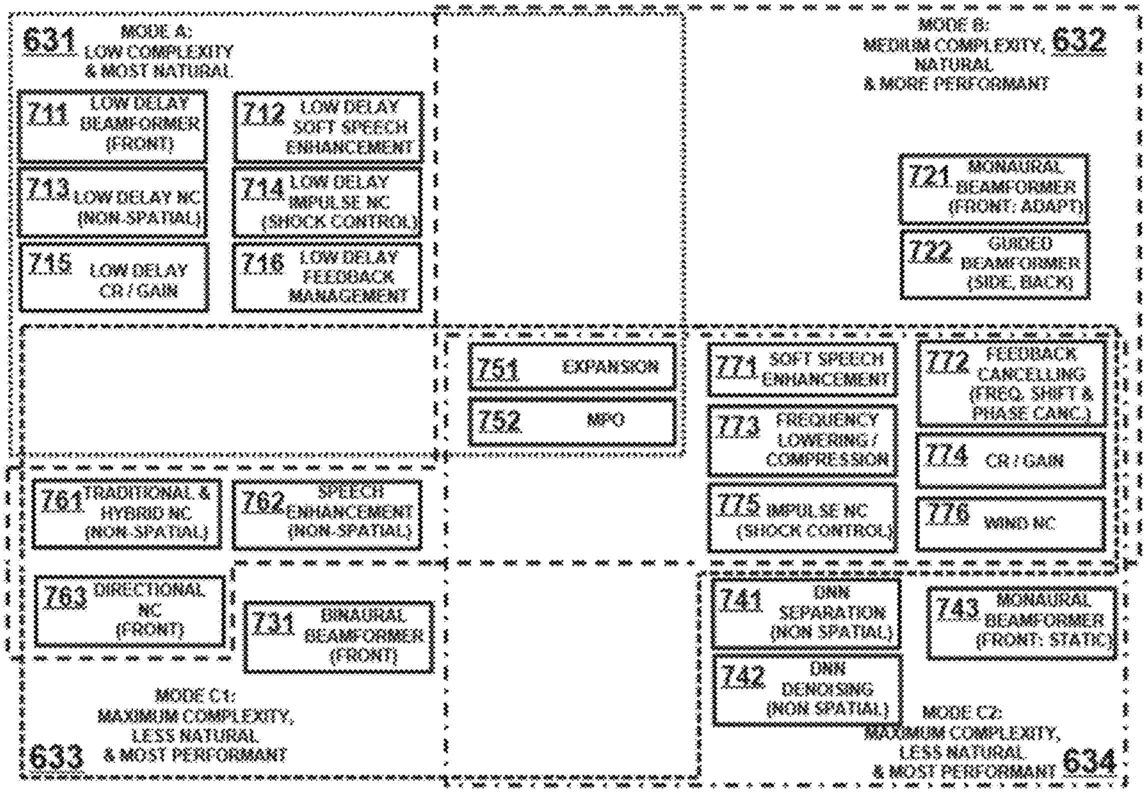
FIG. 7 schematically illustrates a Venn diagram of exemplary sets of different audio processing algorithms.

In some implementations, as illustrated in FIGS. 6 and 7, the different audio processing algorithms 505 may be grouped in different sets 631, 632, 633, 634 of audio processing algorithms 505. In some instances, at least one of the audio processing algorithms 505 included in a first set 631-634 and at least one of the audio processing algorithms 505 included in a second set 631-634 different from the first set are configured to provide for the same signal processing goal and/or are associated with a performance index differing in at least one of dimensions 502-504. In some instances, at least one sets 631-634 comprises at least two different audio processing algorithms 505. In some instances, at least two sets 631-634 share at least one of the audio processing algorithms 505. Thus, an intersection of the at least two sets 631-634 may include the at least one of audio processing algorithm 505. At least one of audio processing algorithms 505 may thus be included in the first set 631-634 and in the second set 631-634. In some instances, at least one of sets 631-634 includes at least one of the audio processing algorithms 505 different from the audio processing algorithms 505 included in the remaining sets 631-634. Thus, the at least one of the audio processing algorithm 505 included in the at least one set 631-634 may be excluded from a union of the remaining sets 631-634.

In some instances, a performance index indicative of a performance of the audio processing algorithms included in sets 631-634 may be associated with each of sets 631-634. The performance index associated with sets 631-634 may have at least one dimension, which may correspond the at least one dimension of the performance index associated with the audio processing algorithms 505 included in the set 631-634. For instance, the first set 631-634 and the second set 631-634 may each be associated with a performance index indicative of the performance index associated with each of audio processing algorithms 505 included in the set 631-634. As another example, the first set 631-634 and the second set 631-634 may each be associated with a performance index indicative of the largest and/or smallest performance index associated with the audio processing algorithms 505 included in the set 631-634.

In some instances, the different audio processing algorithms 505 grouped in different sets 631-634 may correspond two different operational modes of audio processing module 629, wherein, in each operational mode 631-634, one or more of the audio processing algorithms 505 included in the respective set 631-634 may be applied to the audio signal. Thus, when audio processing module 629 is operating in one of operational modes 631-634 corresponding to one of sets 631-634 including the at least one audio processing algorithm 505, the audio processing algorithm 505 included in set 631-634 can be applied on the audio signal, and when the operational mode 631-634 includes at least two audio processing algorithms 505, at least one of the audio processing algorithms 505 can be applied on the audio signal and/or the at least two audio processing algorithms 505 can be applied in a sequence and/or in parallel to the audio signal. In some instances, when audio processing module 629 is operating in one of operational modes 631-634, the number and/or type of audio processing algorithms 505 applied on the audio signal may be determined depending on the audio signal provided by input transducer 602 and/or the audio signal provided by audio signal receiver 604. For instance, the number and/or type of audio processing algorithms 505 applied on the audio signal may be determined depending on at least one class attributed to the audio signal by classifier 617. The number and/or type of audio processing algorithms 505 applied on the audio signal may also be determined depending on a user command, which may be provided by user interface 616, and/or sensor data, which may be provided by sensor unit 618.

As illustrated in FIGS. 6 and 7, the different operational modes 631-634 may comprise, for example, a first mode 631, which may be denoted by a low complexity and most natural. Thus, an audio processing provided in first mode 631 by at least one audio processing algorithm 505 included in first set 631 may provide for a rather natural sound perception and may also be rather conservative regarding resources available in hearing device 110, 120, 210 required to execute the audio processing algorithm 505. Accordingly, first mode 631 may be associated with a performance index having dimension 502 indicative of an impact on available resources being rather high, e.g., due to a rather small footprint of the audio processing on the available resources, and/or dimension 503 indicative of an enhancement of the hearing perception being rather low, e.g., due to a rather small modification of the audio signal provided by the audio processing, and/or dimension 504 indicative of an adverse effect of the audio processing being rather high, e.g., due to a rather small delay and/or sound distortion caused by the audio processing.

A second mode 632 may be denoted by a medium complexity, still natural, and more performant. Thus, an audio processing provided in second mode 632 by at least one audio processing algorithm 505 included in second set 632 may provide for a less natural sound perception as compared to first mode 631, may be less conservative regarding required resources available in hearing device 110, 120, 210, and may be prone to deliver a larger impact on the audio signal. Accordingly, second mode 632 may be associated with a performance index having dimension 502 indicative of an impact on available resources being reduced as compared to the performance index associated with first mode 631, but may still be rather high, e.g., due to an increased footprint of the audio processing on the available resources, and/or dimension 503 indicative of an enhancement of the hearing perception being increased as compared to the performance index associated with first mode 631, e.g., due to an enhanced modification of the audio signal provided by the audio processing, and/or dimension 504 indicative of an adverse effect of the audio processing reduced as compared to the performance index associated with first mode 631, e.g., due to an increased delay and/or sound distortion caused by the audio processing.

A third mode 633 may be denoted by a maximum complexity, less natural, and most performant. Thus, an audio processing provided in third mode 633 by at least one audio processing algorithm 505 included in third set 633 may provide for a rather unnatural or artificial sound perception as compared to second mode 632, may be rather expensive regarding required resources available in hearing device 110, 120, 210, and may accomplish an even larger impact on the audio signal. Accordingly, third mode 633 may be associated with a performance index having dimension 502 indicative of an impact on available resources rather small as compared to the performance index associated with second mode 632, e.g., due to a maximum footprint of the audio processing on the available resources, and/or dimension 503 indicative of an enhancement of the hearing perception being rather high as compared to the performance index associated with second mode 632, e.g., due to an extensive modification of the audio signal provided by the audio processing, and/or dimension 504 indicative of an adverse effect of the audio processing further reduced as compared to the performance index associated with second mode 632, e.g., due to an even larger delay and/or sound distortion caused by the audio processing.

As illustrated, a fourth mode 634 may also be denoted by a maximum complexity, less natural, and most performant. Thus, a performance index associated with fourth mode 634 may have similar values in the at least one dimension 632-634 as compared to third mode 633. In particular, a tradeoff between operating in third mode 633 and fourth mode 634 may then be similar. Accordingly, an operation in third mode 633 or fourth mode 634 may be controlled depending on a preference of the user, e.g., based on a user command provided by user interface 616, and/or depending on the audio signal provided by input transducer 602 and/or the audio signal provided by audio signal receiver 604 and/or depending on sensor data, which may be provided by sensor unit 618. E.g., a decision between operating in third mode 633 or fourth mode 634 may be based on a class attributed to the audio signal and/or a class attributed to the sensor data by classifier 617.

FIG. 7 schematically illustrates a Venn diagram of the exemplary sets 631-634 of exemplary audio processing algorithms 505. An intersection of all four sets 631-634 comprises an expansion algorithm 751 and a maximum power output (MPO) algorithm 752. In this way, a core functionality of hearing device 110, 120, 210 may be provided by executing algorithm 751 and/or algorithm 752 in parallel and/or in sequence in each operational mode 631-634. An intersection of second set 632, third set 633, and fourth set 634 additionally comprises a soft SE algorithm 771, an FC algorithm providing for frequency shift and/or phase cancelling 772, a FreqC and/or frequency lowering algorithm 773, an advanced CR/gain algorithm 774, an advanced INC algorithm 775, and a WNC algorithm 776. Accordingly, at least one additional functionality of hearing device 110, 120, 210 may be provided by also executing at least one of algorithms 771-776 in parallel and/or in sequence, e.g., with algorithm 751, 752, when audio processing module 629 operates in any of operational modes 632-634. An intersection of second set 632 and third set 633 additionally comprises a traditional/hybrid NC algorithm 761 providing for a non-spatial noise cancelling, a directional NC algorithm 763 providing for a noise cancelling in a specific direction or location relative to the user, and a general SE algorithm 762 providing for an enhancement of speech content. Accordingly, at least one additional functionality of hearing device 110, 120, 210 may be provided by also executing at least one of algorithms 761-763 in parallel and/or in sequence, e.g., with algorithm 751, 752, when audio processing module 629 operates in any of operational modes 632, 633.

Furthermore, first set 631 exclusively includes a low delay BF algorithm 711, which may direct the beam to the front of the user, a low delay soft SE algorithm 712, a low delay NC algorithm 713 providing for noise cancelling in a non-spatially resolved manner, a low delay INC algorithm 714, a low delay CR/gain algorithm 715, and a low delay FB management algorithm 716. Accordingly, at least one additional functionality of hearing device 110, 120, 210 may be provided by also executing at least one of algorithms 713-716 in parallel and/or in sequence, e.g., with algorithm 751, 752, when audio processing module 629 operates in first operational mode 631. Second set 632 exclusively includes a monaural BF algorithm 721, which may be adaptive, e.g., with regard a directivity and/or width of the acoustic beam, and a guided BF algorithm 722, which may be configured to guide the beam to a side and/or back of the user. Accordingly, at least one additional functionality of hearing device 110, 120, 210 may be provided by also executing at least one of algorithms 721, 722 in parallel and/or in sequence, e.g., with algorithm 751, 752, when audio processing module 629 operates in second operational mode 632. Third set 633 exclusively includes a binaural BF algorithm 731. Accordingly, another additional functionality of hearing device 110, 120, 210 may be provided by also executing algorithm 731 in parallel and/or in sequence, e.g., with algorithm 751, 752, when audio processing module 629 operates in third operational mode 633. Fourth set 634 exclusively includes a monaural BF algorithm 743, which may be static, an AOS algorithm 741 including at least one DNN for separating audio content of at least one acoustic object in the audio signal, and a NC algorithm 742 implemented by a DNN, which may provide for noise cancelling in a non-spatial manner. Accordingly, at least one additional functionality of hearing device 110, 120, 210 may be provided by also executing any of algorithms 741-743 in parallel and/or in sequence, e.g., with algorithm 751, 752, when audio processing module 629 operates in fourth operational mode 634.

As noted above, one or more of algorithms 713-716, 721, 722, 731, 741-743, 751, 752, 761-763, 771-776 may be executed in parallel and/or in sequence in each of operational modes 631-634. A decision, which of algorithms 713-716, 721, 722, 731, 741-743, 751, 752, 761-763, 771-776 are executed in each of operational modes 631-634 may further depend on the audio signal provided by input transducer 602 and/or the audio signal provided by audio signal receiver 604 and/or sensor data, which may be provided by sensor unit 618, and/or a user command, which may be provided by user interface 616. E.g., the decision may be based on whether classifier 617 attributes at least one predetermined class to the audio signal and/or sensor data. Additionally or alternatively, selection rules may be applied which may define which of algorithms 713-716, 721, 722, 731, 741-743, 751, 752, 761-763, 771-776 may be applied at the expense of another and/or in conjunction with one another. To illustrate, when operating in fourth operational mode 634, the selection rules may define that only one of AOS algorithm 741 or NC algorithm 742, which may both be implemented as a DNN, may be executed, e.g., in order not to overload the available processing resources. To illustrate, when operating in fourth operational mode 634, the selection rules may define that each of the AOS algorithm 741 and NC algorithm 742, when executed, will be executed in conjunction with monaural BF algorithm 743, e.g., to provide for a good quality of the audio signal. As another example, when operating in second operational mode 632, the selection rules may define that only one of monaural BF algorithm 721 or guided BF algorithm 722 may be executed, e.g., in order not to negatively influence a desired effect of the beamforming by forming too many beams.

Turning back to FIG. 6, target index determination module 623 is configured to determine a target index indicative of a target performance of said processing of the audio signal. E.g., the target index may be indicative of an applicability of processing algorithms 505, 713-716, 721, 722, 731, 741-743, 751, 752, 761-763, 771-776 relative to the performance index. E.g., the target index may thus constrain an applicability of the processing algorithms and may then also be referred to as a constraint index. E.g., the target index may be indicative of one or more goals of the processing of the audio signal. In particular, the target index can be determined in at least one of dimensions 502-504 of the performance index of at least one of the audio processing algorithms. E.g., when the audio processing algorithms are associated with a performance index in three dimensions 502-504, the target index may be determined as a scalar corresponding to one of dimensions 502-504, a pair of values, e.g., a two-dimensional vector, corresponding to two of dimensions 502-504, or a triple, e.g., a three-dimensional vector, corresponding to three of dimensions 502-504. The target index can thus be comparable with at least one dimension 502-504 of the performance index associated with a respective audio processing algorithm. E.g., the target index may be determined as a threshold, wherein an audio procession algorithm associated with a performance index in one or more dimensions 502-504 exceeding the threshold may be applied to the audio signal, and an audio procession algorithm associated with a performance index in one or more dimensions 502-504 falling below the threshold may not be applied to the audio signal. As another example, when the performance index and/or target index are provided as an n-tuple or vector in at least two of dimensions 502-504, the performance index and target index may be compared by determining an absolute value of the n-tuple or vector before the comparison. E.g., the absolute value of the target index may then constitute a threshold for the absolute value of the performance index.

As illustrated, target index determination module 623 may also be configured to receive the audio signal provided by input transducer 602 after it has been converted into a digital signal by analog-to-digital converter 603, and/or the audio signal provided by audio signal receiver 604, after it has been decoded by decoder 605. Further, the information about resources currently available in hearing device 110, 210, as acquired by hearing device management module 614, may also be received by target index determination module 623. Further, a user command, which may be provided by user interface 616, and/or sensor data, which may be provided by sensor unit 618, may also be received by target index determination module 623. Accordingly, the target index may be determined based on at least one of the user command indicative of the target index; the evaluated audio signal, wherein the target index is determined based on the evaluated audio signal; the evaluated sensor data; and the acquired information about resources available in the hearing device.

To illustrate, when the user command indicates that the user is rather allergic to adverse effects of the audio signal processing, e.g., the user dislikes latency and/or artefacts in the reproduced sound, dimension 304 of the target index may be determined to be rather low. When the evaluated audio signal would indicate a rather simple acoustic environment, e.g., a non-speech scenario and/or little noise scenario, which may require little processing effort, dimension 303 of the target index indicative of an enhancement of the hearing perception of the user by the audio processing may be determined to be rather low. In particular, shooting at sparrows with guns may thus be avoided. When the sensor data would indicate circumstances requiring a rather elevated enhancement of the hearing perception of the user, e.g., when physiological sensor data provided by physiological sensor 133-135 would indicate a medical urgency situation and/or when environmental sensor data provided by environmental sensor 130-132 and/or movement sensor data provided by movement sensor 136 would indicate the user being in a situation of high traffic or another situation requiring high concentration, dimension 303 of the target index may be determined to be rather high. When the information about resources currently available in hearing device 110, 210 would indicate the resources being rather low, e.g., a remaining battery power being rather small and/or processor 112, 122 being rather overloaded with processing tasks, dimension 302 of the target index indicative of an impact of the audio processing algorithm on available resources available may be determined to be rather low.

Audio processing algorithm selection module 625 is configured to select, depending on the target index, at least one of processing algorithms 505, 713-716, 721, 722, 731, 741-743, 751, 752, 761-763, 771-776 to be applied on the audio signal by audio processing module 629. To this end, the target index determined by target index determination module 623 may be received by audio processing algorithm selection module 625. Further, the performance index associated with the different audio processing algorithms is available by audio processing algorithm selection module 625. Audio processing algorithm selection module 625 can thus be configured to compare the target index with the performance index associated with the different audio processing algorithms. For instance, as described above, the target index may be provided as a threshold, wherein an audio processing algorithm with a performance index exceeding the threshold may be selected and an audio processing algorithm with a performance index falling below the threshold may be rejected by audio processing algorithm selection module 625. In some examples, e.g., when multiple audio processing algorithms with a similar or identical processing goal would exceed the threshold, the audio processing algorithm closest to the threshold may be selected by audio processing algorithm selection module 625.

As illustrated, audio processing algorithm selection module 625 may also be configured to receive the audio signal provided by input transducer 602 after it has been converted into a digital signal by analog-to-digital converter 603, and/or the audio signal provided by audio signal receiver 604, after it has been decoded by decoder 605, and/or sensor data provided by sensor unit 618. The selection of one or more audio processing algorithms 505, 713-716, 721, 722, 731, 741-743, 751, 752, 761-763, 771-776 may then also be based on the audio signal and/or the sensor data. In some instances, the audio signal and/or the sensor data may be classified by classifier 617. At least one class attributed to the audio signal and/or sensor data by classifier 617 may then be received by audio processing algorithm selection module 625. The selection of one or more audio processing algorithms may then also be based on the class attributed to the audio signal and/or sensor data by classifier 617.

In some implementations, audio processing algorithm selection module 625 can select, depending on the target index, one of sets 631-634 of audio processing algorithms 505, and then select, based on the audio signal and/or the sensor data and/or the at least one class associated with the audio signal and/or the sensor data, one or more audio processing algorithms included in the selected set 631-634. In some implementations, audio processing algorithm selection module 625 can directly select, depending on the target index, one or more of audio processing algorithms 505, 713-716, 721, 722, 731, 741-743, 751, 752, 761-763, 771-776. From this first selection of the audio processing algorithms, one or more audio processing algorithms may be selected again in a second selection based on the audio signal and/or the sensor data and/or the at least one class associated with the audio signal and/or the sensor data.

In some implementations, target index determination module 623 and/or audio processing algorithm selection module 625 can be configured to learn and/or estimate the target index in order to select one or more of audio processing algorithms 505, 713-716, 721, 722, 731, 741-743, 751, 752, 761-763, 771-776 mostly adapted to a current scene and/or the user's preferences. For instance, the target index determination module 623 and/or audio processing algorithm selection module 625 may be implemented as a machine learning (ML) algorithm, e.g., a NN or a DNN. The ML algorithm may be trained by a set of training data comprising previously acquired user commands and/or audio signals and/or sensor data and/or information about resources available in the hearing device, which may be labelled by a corresponding target index having at least one of dimensions 502-504. The trained ML algorithm may then determine the target index and/or select, depending on the target index, one or more of the audio processing algorithms based on input data comprising at least one of a currently received audio signal and/or sensor data and/or information about resources available in the hearing device. Thus, the trained ML algorithm may be configured, e.g., to predict the target index and/or select one or more of the audio processing algorithms without requiring further input from the user, e.g., via a user command.

Figure 8:
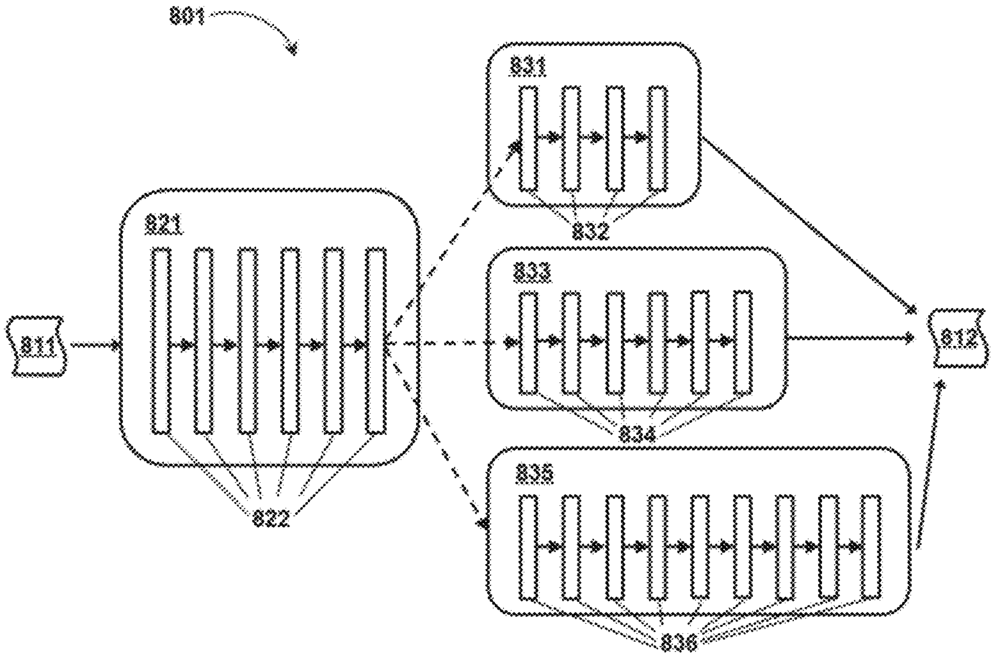
FIG. 8 schematically illustrates exemplary audio processing algorithms implemented by a deep neural network (DNN)

FIG. 8 schematically illustrates modular audio signal processing algorithms 801 which may be implemented as a DNN. As illustrated, audio signal processing algorithms 801 comprise an encoder part 821 configured to encode an input audio signal 811, and one or more decoder parts 831, 833, 834 configured to decode the encoded audio signal 811. The decoded audio signal 812 may then be provided, as the processed audio signal, to output transducer 117, 127, 614 to output an output audio signal so as to stimulate the user's hearing. As illustrated, encoder part 821 comprises a plurality of layers 822, e.g., at least one input layer and a number of hidden layers. The output of the last hidden layer 822 of encoder part 821 can then be fed into one of decoder parts 831, 833, 834. Thus, a first NN may be provided by encoder part 821 and first decoder part 831, a second NN may be provided by encoder part 821 and second decoder part 833, and a third NN may be provided by encoder part 821 and third decoder part 835. Decoder parts 831, 833, 834 are distinguished by a different number of layers 832, 834, 836. E.g., each decoder part 831, 833, 834 may comprise an input layer 832, 834, 836 receiving the output of encoder part 821, a number of hidden layers 832, 834, 836, and an output layer 832, 834, 836 to output the decoded audio signal 812. In particular, first decoder part 831 may comprise a smallest number of layers 832, second decoder part 833 may comprise a larger number of layers 834, and third decoder part 835 may comprise a largest number of layers 836.

Thus, a processing of audio signal 811 performed by third NN 821, 835 may be more processing intensive as compared to a processing of audio signal 811 performed by second NN 821, 834. Similarly, a processing of audio signal 811 performed by first NN 821, 831 may be less processing intensive as compared to the processing of audio signal 811 performed by second NN 821, 834. Accordingly, a performance index associated with first NN 821, 831 may be larger in dimension 502 indicative of an impact of the audio processing algorithm on resources available in hearing device 110, 120, 210 as compared to a performance index associated with second NN 821, 833 in dimension 502, which may be larger than a performance index associated with third NN 821, 835 in dimension 502.

Further, a processing of audio signal 811 performed by third NN 821, 835 may have a larger impact on the audio signal with regard to an enhancement of the hearing perception of the user as compared to a processing of audio signal 811 performed by second NN 821, 833. Similarly, a processing of audio signal 811 performed by first NN 821, 831 may have a smaller impact on the audio signal with regard to an enhancement of the hearing perception of the user as compared to the processing of audio signal 811 performed by second NN 821, 833. Accordingly, a performance index associated with first NN 821, 831 may be smaller in dimension 503 indicative of an enhancement of the hearing perception of the user by the processing of the audio signal as compared to a performance index associated with second NN 821, 833 in dimension 503, which may be smaller than a performance index associated with third NN 821, 835 in dimension 503.

Further, a processing of audio signal 811 performed by third NN 821, 835 may also be more prone to have an adverse effect, e.g., with regard to a latency produced by the processing, as compared to a processing of audio signal 811 performed by second NN 821, 833. Similarly, a processing of audio signal 811 performed by first NN 821, 831 may be less prone to have an adverse effect as compared to the processing of audio signal 811 performed by second NN 821, 833. Accordingly, a performance index associated with first NN 821, 831 may be larger in dimension 504 indicative of the adverse effect as compared to a performance index associated with second NN 821, 833 in dimension 504, which may be larger than a performance index associated with third NN 821, 835 in dimension 504.

Accordingly, when a target index determined by target index determination module 623 would indicate a smaller value in dimensions 502, 504, and/or a larger value in dimension 503, audio processing algorithm selection module 625 can be configured to select third NN 821, 835 or second NN 821, 833 in place of first NN 821, 831, and/or third NN 821, 835 in place of second NN 821, 833. Conversely, when a target index determined by target index determination module 623 would indicate a larger value in dimensions 502, 504, and/or a smaller value in dimension 503, audio processing algorithm selection module 625 can be configured to select first NN 821, 831 or second NN 821, 833 in place of third NN 821, 835, and/or first NN 821, 831 in place of second NN 821, 833.

As another example, when a target index determined by target index determination module 623 would indicate a smaller value in all dimensions 502-504, audio processing algorithm selection module 625 can be configured to determine a preference between dimensions 502-504. E.g., when resources available in hearing device 110, 120, 210 are rather sparse, which may be indicated by the information acquired by hearing device management module 614, and/or when the user has a distaste against adverse effects produced by the processing, which may be indicated by the user command provided by user interface 616, dimension 502, 504 may be associated with a larger priority as compared to dimension 503. Accordingly, audio processing algorithm selection module 625 can then be configured to select first NN 821, 831 or second NN 821, 833 in place of third NN 821, 835, and/or first NN 821, 831 in place of second NN 821, 833.

As another example, processing algorithm selection module 625 can be configured to select one or more audio processing algorithms associated with a performance index having a best match with the target index in at least one of dimensions 502-504. E.g., when all available audio processing algorithms 821, 831-834 would be associated with a performance index which is rather far off the target index in at least one of dimensions 502-504, the remaining dimensions 502-504 may be associated with a larger priority.

Accordingly, audio processing algorithm selection module 625 can then be configured to select the best matching NN 821, 831, 833, 835 in the remaining dimensions 502-504.

As a further example, processing algorithm selection module 625 can be configured to select one or more audio processing algorithms associated with a performance index closest to the target index in at least one of dimensions 502-504 in which the performance index of all available audio processing algorithms is most distant from the target index. Accordingly, audio processing algorithm selection module 625 can then be configured to select the NN 821, 831, 833, 835 closest to the target index in dimension 502-504 most distant from the performance index of all available NNs 821, 831, 833, 835.

In some implementations, NNs 821, 831, 833, 835 can be configured as a noise cancelling (NC) algorithm. E.g., NNs 821, 831, 833, 835 may be implemented as DNN denoising algorithm 742, which may be included in set 634 of audio processing algorithms 741-743, 751, 752, 771-776. E.g., an audio processing algorithm as disclosed in European application number EP 23164336.2 may be implemented in such a way. In some implementations, NNs 821, 831, 833, 835 can be configured as an acoustic object separation (AOS) algorithm. E.g., NNs 821, 831, 833, 835 may be implemented as DNN separation algorithm 741, which may be included in set 634 of audio processing algorithms 741-743, 751, 752, 771-776. E.g., an audio processing algorithm as disclosed in international patent application Nos. PCT/EP 2020/051 734 and PCT/EP 2020/051 735 may be implemented in such a way.

Figure 9:
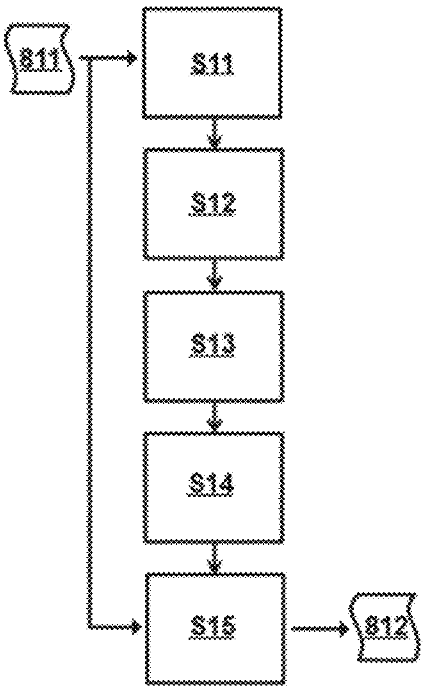
FIG. 9 schematically illustrates an exemplary method of processing an audio signal according to principles described herein.

FIG. 9 illustrates a block flow diagram for an exemplary method of processing input audio signal 311. The method may be executed by processor 310 of hearing device 110, 210 and/or another processor communicatively coupled to processor 310. At operation S11, audio signal 811 is received. At operation S12, different audio processing algorithms are provided, which are each associated with a performance index indicative of a performance of the respective audio processing algorithm when applied on audio signal 811. At operation S13, a target index relative to the performance index is determined. At operation S14, at least one of the processing algorithms is selected depending on the target index. At operation S15, audio signal 811 is processed by applying the selected audio processing algorithm on the audio signal 811 to generate a processed audio signal 812. Subsequently, an output audio signal based on processed audio signal 812 can be output by output transducer 117, 127 so as to stimulate the user's hearing.

While the principles of the disclosure have been described above in connection with specific devices and methods, it is to be clearly understood that this description is made only by way of example and not as limitation on the scope of the invention. The above described embodiments are intended to illustrate the principles of the invention, but not to limit the scope of the invention. Various other embodiments and modifications to those embodiments may be made by those skilled in the art without departing from the scope of the present invention that is solely defined by the claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A method of operating a hearing device configured to be worn at an ear of a user, the method comprising:
- receiving an audio signal;
- processing the audio signal by at least one audio processing algorithm to generate a processed audio signal;
- outputting, by an output transducer included in the hearing device, an output audio signal based on the processed audio signal so as to stimulate the user's hearing;
- providing different audio processing algorithms each configured to be applied on the audio signal and associated with a performance index indicative of a performance of the audio processing algorithm when applied on the audio signal, wherein the performance index is predetermined for each audio processing algorithm prior to the processing of the audio signal;
- determining a target index relative to the performance index, the target index indicative of a target performance of said processing of the audio signal;
- selecting, depending on the target index, at least one of the processing algorithms; and
- applying the selected processing algorithm on the audio signal.

2. The method of claim 1, wherein the performance index has at least one dimension comprising at least one of:
- a dimension indicative of an impact of the audio processing algorithm on resources available in the hearing device;
- a dimension indicative of an enhancement of a hearing perception of the user by the processing of the audio signal; or
- a dimension indicative of an adverse effect of the processing of the audio signal for the hearing perception of the user.

3. The method of claim 2, wherein the impact of the audio processing algorithm on available resources comprises at least one of:
- a power consumption of the algorithm;
- a computational load of executing the algorithm;
- a memory requirement of the algorithm; or
- a communication bandwidth required to execute the algorithm in a distributed processor comprising at least two processing units communicating with each other.

4. The method of claim 2, wherein the enhancement of the hearing perception of the user comprises at least one of:
- a measure of a clarity of sound encoded in the audio signal;
- a measure of an understandability of a speech encoded in the audio signal;
- a measure of a listening effort needed for understanding information encoded in the audio signal;
- a measure of a comfort when listening to sound encoded in the audio signal;
- a measure of a naturalness of sound encoded in the audio signal;
- a measure of a spatial perceptibility of sound encoded in the audio signal; or
- a measure of a quality of sound encoded in the audio signal.

5. The method of claim 2, wherein the adverse effect of the processing comprises at least one of:
- a level of artefacts in the processed audio signal;
- a level of distortions of sound encoded in the processed audio signal; or
- a level of a latency for outputting the output audio signal based on the processed audio signal.

6. The method of claim 1, wherein the determining the target index comprises at least one of:

receiving, from a user interface, a user command indicative of the target index;

evaluating the audio signal, wherein the target index is determined based on the evaluated audio signal;

receiving, from a sensor included in the hearing device, sensor data, wherein the target index is determined based on the sensor data; or acquiring information about resources available in the hearing device, wherein the target index is determined based on the information.

7. The method of claim 6, wherein the user command is indicative of a value desired by the user of the performance index.

8. The method of claim 1, wherein the different audio processing algorithms comprise at least two audio processing algorithms configured to provide for a same signal processing goal which are associated with a differing performance index, wherein the signal processing goal comprises at least one of:

an enhancement of a speech content of a single talker in the audio signal;

an enhancement of a speech content of a plurality of talkers in the audio signal;

a reproduction of sound emitted by an acoustic object in an environment of the user encoded in the audio signal;

a reproduction of sound emitted by a plurality of acoustic objects in the environment of the user encoded in the audio signal;

a reduction and/or cancelling of noise and/or reverberations in the audio signal;

a preservation of acoustic cues contained in the audio signal;

a suppression of noise in the audio signal;

an improvement of a signal to noise ratio (SNR) in the audio signal;

a spatial resolution of sound encoded in the audio signal depending on a direction of arrival (DOA) of the sound and/or depending on a location of at least one acoustic object emitting the sound in the environment of the user;

a directivity of an audio content in the audio signal provided by a beamforming or a preservation of an omnidirectional audio content in the audio signal;

an amplification of sound encoded in the audio signal adapted to an individual hearing loss of the user; or an enhancement of music content in the audio signal.

9. The method of claim 1, wherein the different audio processing algorithms comprise a first set of audio processing algorithms and a second set of audio processing algorithms, wherein at least one of the audio processing algorithms of the first set and at least one of the audio processing algorithms of the second set are configured to provide for a same signal processing goal and are associated with a differing performance index.

10. The method of claim 9, wherein, depending on the target index, at least two of the audio processing algorithms of the first set or the second set are selected to be applied in a sequence and/or in parallel on the audio signal to generate the processed audio signal.

11. The method of claim 9, wherein the audio processing algorithms comprise at least one neural network (NN).

12. The method of claim 11, wherein the NN comprises an encoder part configured to encode the audio signal, and a decoder part configured to decode the encoded audio signal.

13. The method of claim 12, wherein the different audio processing algorithms comprise a first NN comprising the encoder part and a first decoder part, and a second NN comprising the encoder part and a second decoder part differing from the first decoder part, wherein the first NN and the second NN are associated with a differing performance index.

14. The method of claim 13, wherein the first set of audio processing algorithms comprises the first NN, and the second set of audio processing algorithms comprises the second NN.

15. A hearing device configured to be worn at an ear of a user, the hearing device comprising:

an input transducer configured to provide an audio signal indicative of a sound detected in an environment of the user;

a processor configured to process the audio signal by at least one audio processing algorithm to generate a processed audio signal; and an output transducer configured to output an output audio signal based on the processed audio signal so as to stimulate the user's hearing, wherein the processor is further configured to:

provide different audio processing algorithms each configured to be applied on the audio signal and associated with a performance index indicative of a performance of the audio processing algorithm when applied on the audio signal, wherein the performance index is pre-determined for each audio processing algorithm prior to the processing of the audio signal;

determine a target index relative to the performance index, the target index indicative of a target performance of said processing of the audio signal;

select, depending on the target index, at least one of the processing algorithms; and apply the selected processing algorithm on the audio signal.

* * * * *